US010715887B2

(12) United States Patent
Seok et al.

(10) Patent No.: US 10,715,887 B2
(45) Date of Patent: Jul. 14, 2020

(54) SILICON-PHOTONICS-BASED OPTICAL SWITCH WITH LOW POLARIZATION SENSITIVITY

(71) Applicant: The Regents of the University of California, Oakland, CA (US)

(72) Inventors: Tae Joon Seok, Berkeley, CA (US); Sangyoon Han, Emeryville, CA (US); Ming Chiang A Wu, Moraga, CA (US)

(73) Assignee: The Regents of the University of California, Oakland, CA (US)

( * ) Notice: Subject to any disclaimer, the term of this patent is extended or adjusted under 35 U.S.C. 154(b) by 0 days.

(21) Appl. No.: 16/331,824

(22) PCT Filed: Sep. 11, 2017

(86) PCT No.: PCT/US2017/050999
§ 371 (c)(1),
(2) Date: Mar. 8, 2019

(87) PCT Pub. No.: WO2018/049345
PCT Pub. Date: Mar. 15, 2018

(65) Prior Publication Data
US 2019/0253775 A1  Aug. 15, 2019

Related U.S. Application Data

(60) Provisional application No. 62/385,343, filed on Sep. 9, 2016.

(51) Int. Cl.
*H04Q 11/00* (2006.01)
*G02F 1/295* (2006.01)
*H04J 14/02* (2006.01)

(52) U.S. Cl.
CPC ........ *H04Q 11/0005* (2013.01); *G02F 1/295* (2013.01); *H04J 14/02* (2013.01);
(Continued)

(58) Field of Classification Search
None
See application file for complete search history.

(56) References Cited

U.S. PATENT DOCUMENTS 6,970,619 B2  11/2005  Baumann et al.
7,116,856 B2  10/2006  Iio et al.
(Continued)

FOREIGN PATENT DOCUMENTS

JP    S5648603 A  *  5/1981
JP    09-005799 A     1/1997
(Continued)

OTHER PUBLICATIONS

Akhilesh S. P. Khope et al., "Elastic WDM crossbar switch for data centers," Proc. of the 2016 IEEE Optical Interconnects Conference (OI), dated 2016, pp. 48-49.
(Continued)

*Primary Examiner* — David W Lambert
(74) *Attorney, Agent, or Firm* — Kaplan Breyer Schwarz, LLP

(57) ABSTRACT

A polarization-independent optical switching system capable of rerouting light signals is disclosed. The system includes a plurality of switching cells, each including a pair of bus waveguides that are formed in different planes above a substrate. Each bus waveguide supports low-loss propagation of both the TE- and TM-polarization modes and are optically decoupled when the switch is in an unswitched state. In its switched state, a shunt waveguide that also supports low-loss propagation of both polarization modes is moved into proximity with both bus waveguides to form a pair of adiabatic directional couplers that enable the light signal to evanescently couple between each bus waveguide and the shunt waveguide. As a result, the path of a light signal through the switching cell is reconfigured.

27 Claims, 16 Drawing Sheets

(52) U.S. Cl.
CPC ........... *H04Q 2011/0016* (2013.01); *H04Q 2011/0035* (2013.01); *H04Q 2011/0058* (2013.01)

(56) References Cited

U.S. PATENT DOCUMENTS

| | | | |
|---|---|---|---|
| 8,891,914 B2 | 11/2014 | Ticknor et al. | |
| 8,938,142 B2 | 1/2015 | Shastri et al. | |
| 9,405,066 B2 | 8/2016 | Mahgerefteh et al. | |
| 2002/0034372 A1 | 3/2002 | Alibert et al. | |
| 2002/0181855 A1* | 12/2002 | Xue | G02B 6/12002 385/23 |
| 2003/0108274 A1* | 6/2003 | Haronian | G02B 6/122 385/17 |
| 2003/0108290 A1 | 6/2003 | Zhang et al. | |
| 2007/0258681 A1 | 11/2007 | Takabayashi et al. | |
| 2009/0220228 A1 | 9/2009 | Popovic | |
| 2012/0105944 A1 | 5/2012 | Wang et al. | |
| 2012/0170111 A1 | 7/2012 | Doerr et al. | |
| 2014/0212104 A1* | 7/2014 | Cho | G02B 6/136 385/131 |
| 2016/0327751 A1 | 11/2016 | Wu et al. | |
| 2016/0359568 A1 | 12/2016 | De Dobbelaere et al. | |
| 2019/0253775 A1 | 8/2019 | Seok et al. | |

FOREIGN PATENT DOCUMENTS

| | | |
|---|---|---|
| WO | 2014/089454 A2 | 6/2014 |
| WO | 2015/147966 A2 | 10/2015 |

OTHER PUBLICATIONS

Amin Vandat et al., "The emerging optical data center," in Optical Fiber Communication Publisher: Optical Society of America, dated 2011, 3 pp.
Authorized Officer Lee W. Young, International Search Report and Written Opinion issued in PCT Application No. PCT/US2010/063127 dated Feb. 11, 2019.
Authorized Officer Shane Thomas, International Search Report issued in PCT Application No. PCT/US2017/050999 dated Nov. 27, 2017.
Authorized Officer: Lee W. Young, "International Search Report and Written Opinion" issued in counterpart International Patent Application No. PCT/US2015/010811, dated Sep. 16, 2015, Publisher: PCT.
Dritan Celo et al., "32x32 Silicon Photonic Switch," presented at the Optoelectronics and Communications Conference.(OECC), dated 2016, 3 pp.
George Porter et al., "Integrating microsecond circuit switching into the data center," in Proceedings of the ACM SIGCOMM 2013 conference on SIGCOMM, New York, NY, USA, Aug. 12, 2013, pp. 447-458.
Han et al., Large-scale silicon photonic switches with movable directional couplers, Apr. 2015 / Optica, pp. 370-375, vol. 2, No. 4.
Han Wan et al., "2×2 Adiabatic 3-dB Coupler on Silicon-on-Insulator Rib Waveguides", Publisher: Department of electrical and Computer Engineering, University of British Columbia, Vancouver, Canada, Published in: CA.
He Liu et al., "Circuit Switching Under the Radar with REACToR," in Proceedings of the 11th USENIX Conference on Networked Systems Design and Implementation, Berkeley, CA, USA, Apr. 2, 2014, pp. 1-15.
Ken Tanizawa et al., "Novel polarization diversity without switch duplication of a Si-wire PILOSS optical switch", Optics Express, Mar. 21, 2016, Publisher: Optical Society of America, 8 pp., vol. 24, No. 7.
Ken Tanizawa et al., "4x4 Si-wire optical path switch with off-chip polarization diversity," Opto-Electronics and Communications Conference (OECC), dated 2015, pp. 1-3.
Ken Tanizawa et al., "Silicon photonic 32×32 strictly-non-blocking blade switch and its full path characterization," in OptoElectronics and Communications Conference (OECC), dated 2016, 3 pp.
Nathan Farrington et al., "Helios: a hybrid electrical/optical switch architecture for modular data centers," ACM SIGCOMM Computer Communication Review, Aug. 30, 2010, pp. 339-350, vol. 41, No. 4.
Nathan L. Binkert et al., "Optical high radix switch design," "Micro IEEE", May 1, 2012, pp. 100-109, vol. 32, No. 3.
Notice of Allowance received for U.S. Appl. No. 15/109,761, dated Jun. 14, 2018, 5 pages.
Notice of Allowance received for U.S. Appl. No. 15/109,761, dated May 29, 2018, 8 pages.
Sebastien Rumley et al., "Impact of photonic switch radix on realizing optical interconnection networks for exascale systems," Proc. of the IEEE Optical Interconnects Conference, dated 2014, pp. 98-99.
Shigeru Nakamura et al., "High extinction ratio optical switching independently of temperature with silicon photonic 1×8 switch," in Optical Fiber Communication Conference, dated 2012, 3 pp.
Tae Joon Seok et al., "Large-scale broadband digital silicon photonic switches with vertical adiabatic couplers," Optica, Jan. 1, 2016, pp. 64-70, vol. 3, No. 1.
Yuta Akihama et al., "Single and multiple optical switches that use freestanding silicon nanowire waveguide couplers", e16y; doi:10.1038/ISA.2012.16, "Light: Science &Applications (2012)", Jun. 22, 2012, Publisher: CIOMP, Published in: JP.

* cited by examiner

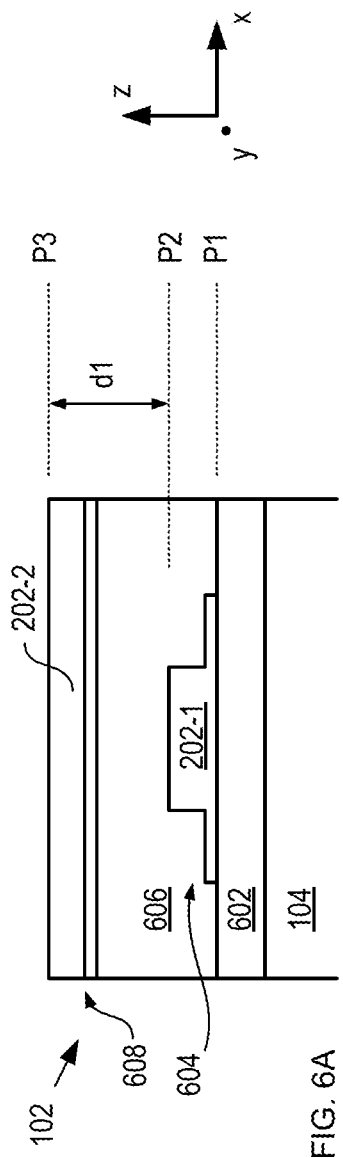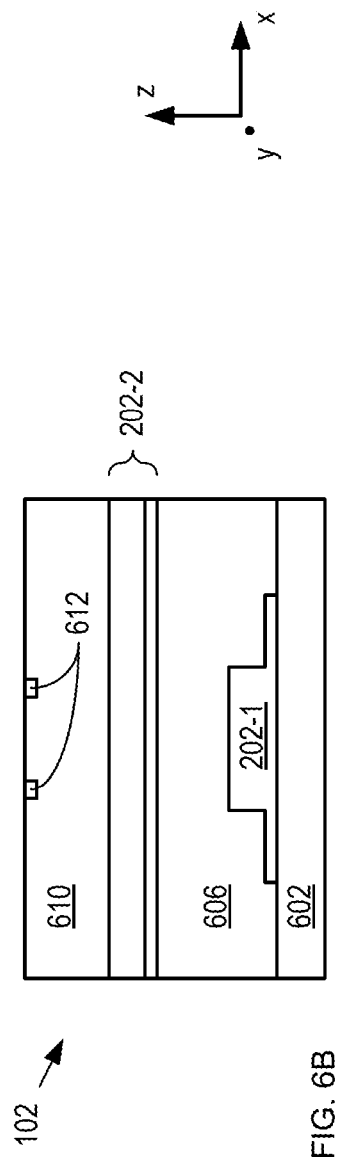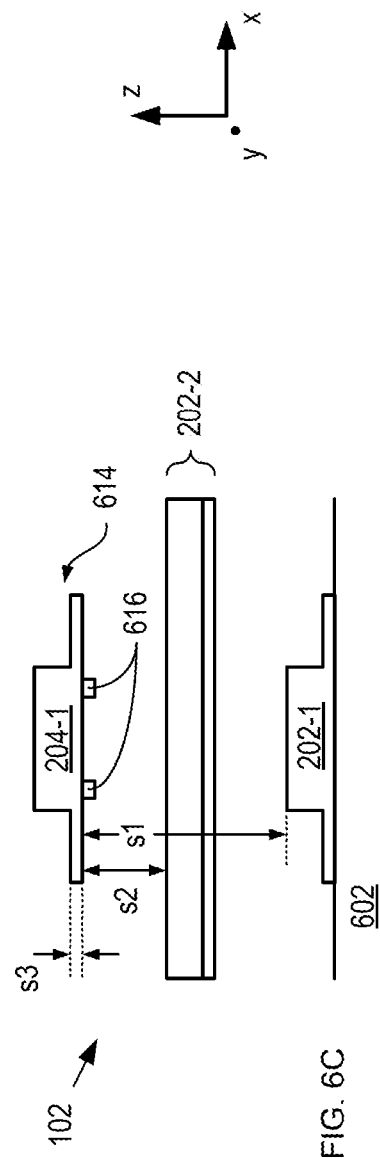

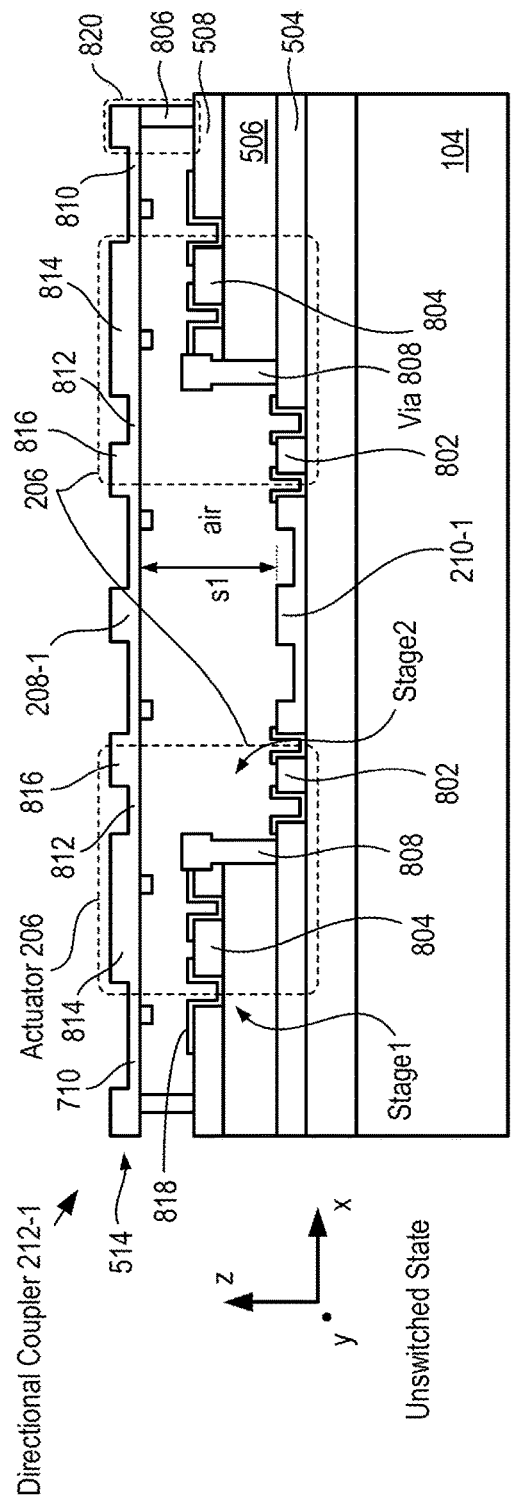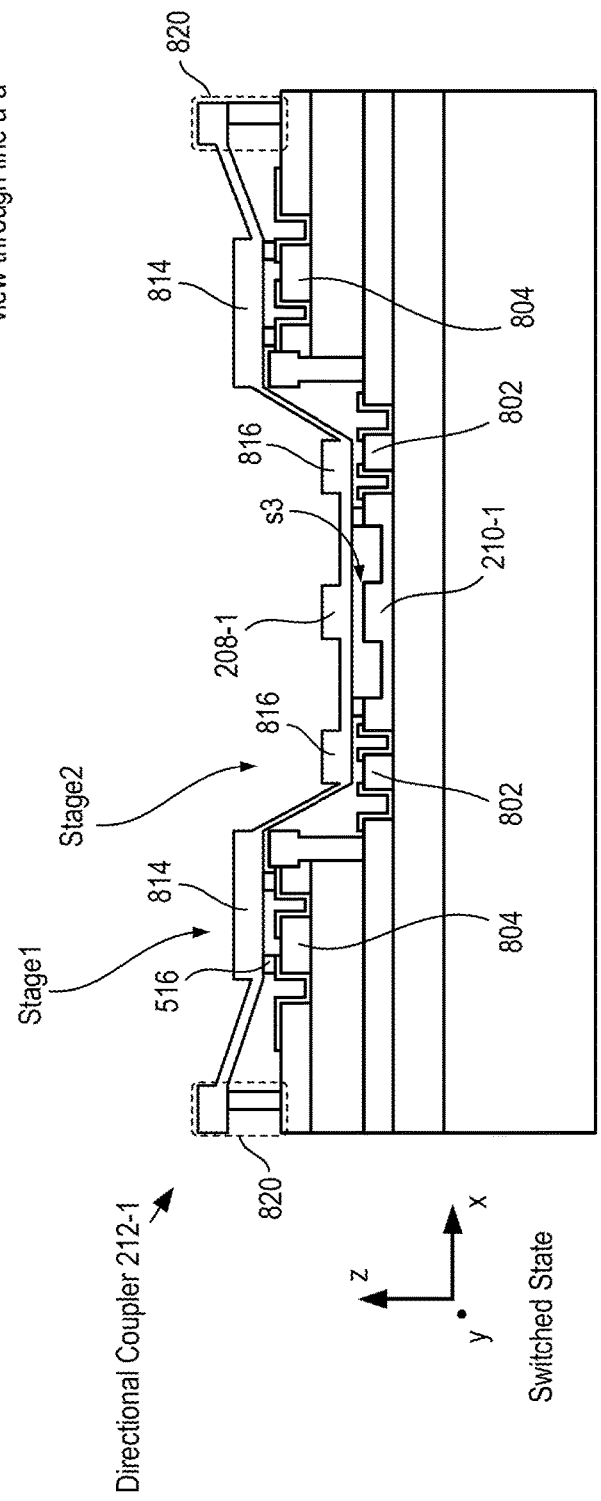
FIG. 8A
FIG. 8B

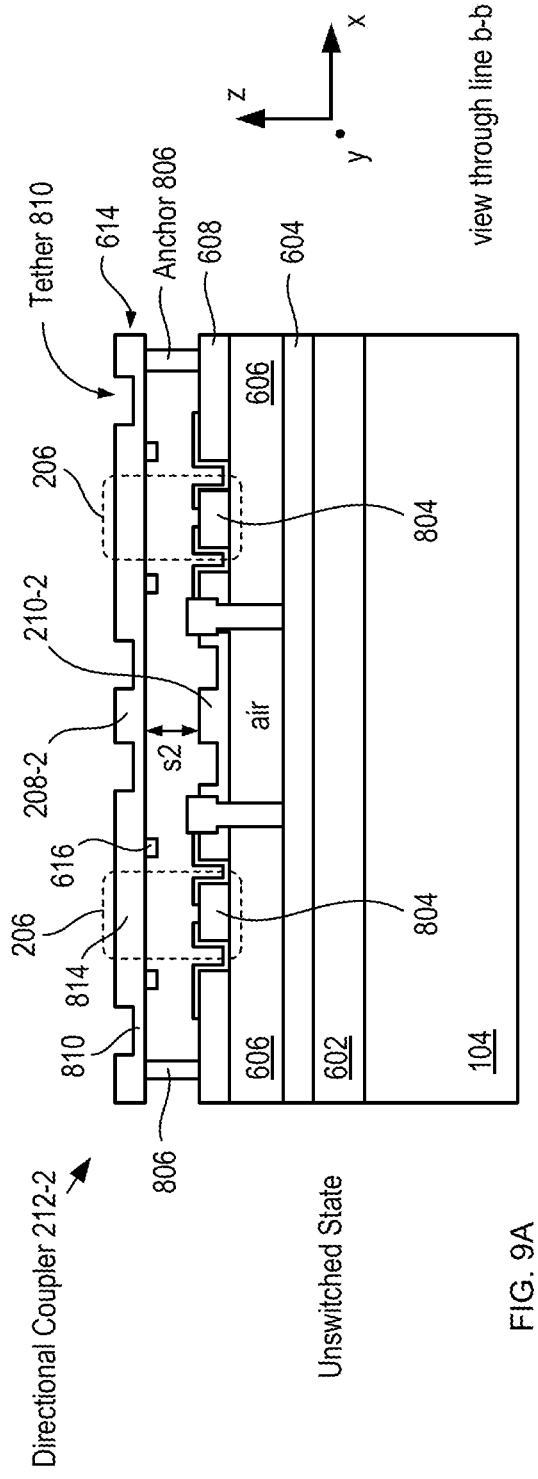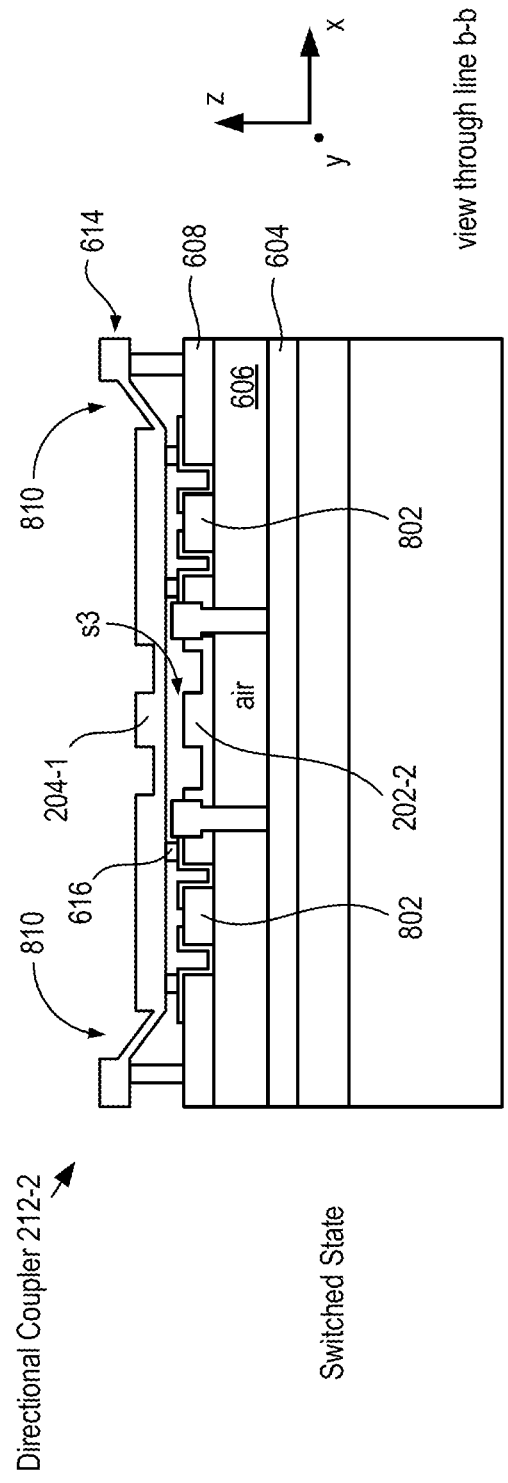

SILICON-PHOTONICS-BASED OPTICAL SWITCH WITH LOW POLARIZATION SENSITIVITY

CROSS REFERENCE TO RELATED APPLICATIONS

This case claims priority of U.S. Provisional Patent Application Ser. No. 62/385,343, filed Sep. 9, 2016, which is incorporated herein by reference.

If there are any contradictions or inconsistencies in language between this application and one or more of the cases that have been incorporated by reference that might affect the interpretation of the claims in this case, the claims in this case should be interpreted to be consistent with the language in this case.

STATEMENT REGARDING FEDERALLY SPONSORED RESEARCH

This invention was made with Government support under Contract Nos. HR0011-11-2-0021 and HR0011-17-1-0001 awarded by the Defense Advanced Projects Research Agency (DARPA) and Grant No. EEC0812072 awarded by the National Science Foundation (NSF). The Government has certain rights in the invention.

FIELD OF THE INVENTION

The present invention relates to optical communications networks in general, and, more particularly, to optical switches.

BACKGROUND OF THE INVENTION

The explosive growth of cloud computing and big data applications has fueled the expansion of datacenters. Scaling of datacenter networks to support such expansion with current electronic switches is challenging as the link rate increases to 100 Gb/s and beyond. State-of-the-art electronic switches such as Broadcom's Tomahawk has a throughput of 3.2 Tb/s. At high data rate, the radix (input port count) becomes limited. For example, the switch mentioned above has a radix of 32 at 100 Gb/s. A large number of switches are needed to connect the data center. The energy consumption, cost, and latency become serious issues. Photonics technology has been proposed to facilitate the scaling of the datacenters, reducing energy consumption and cost. Examples of such photonic-assisted data center networks are described in N. Farrington, et al., "Helios: a hybrid electrical/optical switch architecture for modular data centers," *ACM SIGCOMM Comput. Commun. Rev.*, Vol. 41, no. 4, pp. 339-350 (2011); A. Vandat, H. Liu, X. Zhao, and C. Johnson, "The emerging optical data center," in *Optical Fiber Communication Conference*, pp. OTuH2 (2011); N. Binkert, et al., "Optical high radix switch design," *Micro IEEE*, Vol. 32, no. 3, pp. 100-109 (2012); G. Porter, et al., "Integrating microsecond circuit switching into the data center," in *Proceedings of the ACM SIGCOMM 2013 conference on SIGCOMM*, New York, N.Y., USA, pp. 447-458 (2013); H. Liu, et al., "Circuit Switching Under the Radar with REACToR," in *Proceedings of the 11th USENIX Conference on Networked Systems Design and Implementation*, Berkeley, Calif., USA, pp. 1-15 (2014); S. Rumley, M. Glick, R. Dutt, and K. Bergman, "Impact of photonic switch radix on realizing optical interconnection networks for exascale systems," *Proc. of the IEEE Optical Interconnects Conference*, pp. 98-99 (2014); A. S. P. Khope, A. A. M. Saleh, J. E. Bowers, and R. C. Alferness, "Elastic WDM crossbar switch for data centers," *Proc. of the 2016 IEEE Optical Interconnects Conference (OI)*, pp. 48-49 (2016).

Integrated-optics technology has matured to a point that it has become a strong candidate technology in optical-circuit switching systems. An integrated-optics system comprises one or more optical waveguides formed on the surface of a substrate, such as a silicon wafer, where the optical waveguides can be combined in myriad arrangements to provide complex optical functionality. Each "surface waveguide" includes a light-guiding core surrounded by cladding material that substantially confines the light signal it conveys. For several reasons, such as compatibility with CMOS electronics, availability of large-scale substrates and volume foundries, etc., integrated-optics systems based on the use of single-crystal silicon as the core material (referred to, herein, as "silicon photonics") has become a dominant PLC technology—particularly for large-scale systems, such as high-port-count OXCs. Low-cost silicon photonic switches could potentially be revolutionary for datacenter networks. They eliminate optical-electrical-optical (O-E-O) conversions and greatly reduce the number of costly and power hungry high-speed data links. Recently, silicon photonic switches with a port count of 32 have been reported, as described in K. Tanizawa et al., "Silicon photonic 32×32 strictly-non-blocking blade switch and its full path characterization," in OptoElectronics and Communications Conference (OECC) 2016; Dritan Celo, Dominic J. Goodwill, Jia Jiang, and et al., "32×32 Silicon Photonic Switch," presented at the Optoelectronics and Communications Conference (OECC), 2016. Unfortunately, the optical loss of these switches is excessively high, around 16 dB for a 32×32 switch. Such high loss exceeds the loss budget of most fiber optic links, which prevent them from being used in data center networks.

Silicon photonic switches with significantly lower optical loss have been realized by incorporating micro-electro-mechanical systems (MEMS) switching mechanism, as disclosed, for example, by Han, et al., in "Large-scale silicon photonic switches with movable directional couplers," *Optica*, Vol. 2, pp. 1-6 (2015) and by Seok, et al., in "Large-scale broadband digital silicon photonic switches with vertical adiabatic couplers," *Optica*, Vol. 3, pp. 64-70 (2016), which is incorporated herein by reference.

Unfortunately, silicon-photonic systems of the prior art are normally characterized by significant polarization sensitivity, which gives rise to large differences in their propagation and insertion losses for different polarization modes—referred to polarization-dependent loss (PDL). Many applications, such as fast optical circuit switches for scalable and reconfigurable datacenter networks, among others, require very low PDL, however. As a result, silicon-photonic based optical switching systems have found little traction in such applications and their use has been substantially limited to single-polarization systems.

Attempts to reduce the polarization dependence of silicon photonic switches include approaches such as those disclosed by Nakamura, et al., in "High extinction ratio optical switching independently of temperature with silicon photonic 1×8 switch," in *Optical Fiber Communication Conference*, 2012, p. OTu2I-3, wherein polarization sensitivity is mitigated by the use of a thick (1.5 micrometer) rib waveguide. It should be noted, however, while the use of thick waveguides affords reduced polarization sensitivity, it is achieved at the expense of lower integration density. Furthermore, the systems disclosed by Nakamura et al rely up on a switch architecture comprising cascaded stages of 1×2 and 2×2 Mach-Zehnder interferometers, which gives rise to high cumulative losses for large-port-count arrangements.

Other attempts to realize polarization-insensitive switches in the prior art include those disclosed by K. Tanizawa, et al., in "4×4 Si-wire optical path switch with off-chip polarization diversity," *Opto-Electronics and Communications Conference (OECC)*, 2015, 2015, pp. 1-3, which uses polarization splitters and combiners. In these systems, incoming signals are first split into its transverse-electric (TE) and transverse-magnetic (TM) polarization components, which propagate through two separate sets of switches. Unfortunately, such systems required the use of external (off-chip) polarization splitters/combiners, which are bulky, or directional couplers as on-chip polarization splitters and combiners; however, it still requires two sets of switches and complex crossing waveguides to route the TE and TM signals. In some cases, external polarization splitters/combiners feed the split signals to opposite ends of the switch with complementary ports, as disclosed in K. Tanizawa, et al., "Non-duplicate polarization-diversity 8×8 Si-wire PILOSS switch integrated with polarization splitter-rotators," Opt. Express 25,10885-10892 (2017), which reduces the number of switches to one set but at the expense of higher crosstalk. Most importantly, all such prior-art polarization-diverse switches use many stages of cascaded 2×2 switches, which leads to high insertion loss at high port count, thus limiting their scalability to high radix switches.

A second issue of silicon photonic switch is size of the switch known as the port count or radix of the switch. Silicon photonic switches are manufactured using optical lithography in integrated circuit foundries. The maximum area that can be exposed in standard lithography systems (steppers or scanners), called reticle field, is limited to a few centimeters by a few centimeters. This limits the number of switching cells that can be integrated in one reticle field and therefore the maximum port count (radix) of the switch. Large-scale switches are needed, for example in hyperscale data centers, to connect a large number of nodes.

A practical, fast, low-cost, low-loss optical switching technology that has low polarization-dependent loss and scalable to high port count is, as yet, unavailable in the prior art.

SUMMARY OF THE INVENTION

The present invention enables rapid, low-loss optical switching in a low-cost, practical switch technology to effect an optical switching system having substantially lower polarization dependence and/or substantially higher port count than achievable in the prior art. Embodiments of the present invention include cross-bar switching elements comprising bus waveguides formed on different planes above a substrate, which eliminates the need for polarization-dependent elements and duplicate switching fabrics for polarization-diverse operation. As a result, the present invention enables switching systems that are well suited for use in telecom and datacom optical circuit switches, such as optical cross connects, wavelength-selective cross connects, reconfigurable optical add-drop multiplexers, 1×2 switches, 2×2 switches, and the like.

An illustrative embodiment of the present invention is a silicon-photonics optical cross-connect that includes an arrangement of 2×2 switching cells disposed on a substrate, where each switching cell includes a pair of fixed-position bus waveguides and a movable shunt waveguide coupled with an actuator that is operative for optically coupling and decoupling the shunt waveguide with the bus waveguides. The first bus waveguide is formed in a first plane above the substrate and includes a first input to the switching cell and a first output. The second bus waveguide is formed in a second plane above the substrate and includes a second input and a second output. Since the first and second bus waveguides lie in different planes above the substrate, they are not optically coupled when the switching cell is in its unswitched state, which avoids the polarization sensitivity associated with prior-art waveguide crossings. Furthermore, each of the bus waveguides and the shunt waveguide has a surface waveguide structure that mitigates their polarization sensitivity.

In its unswitched (i.e., OFF) state, an actuator holds the shunt waveguide above both bus waveguides at heights sufficient to substantially ensure that the shunt waveguide is not optically coupled with either bus waveguide. In this state, the first input is optically coupled with the first output and optically decoupled from the second output, while the second input is optically coupled with the second output and optically decoupled from the first output. As a result, in the OFF state, a light signal injected at the first input propagates directly through the first bus waveguide to the first output port, while a light signal injected at the second input propagates directly through the second bus waveguide to the second output port.

In its switched (i.e., ON) state, the actuator positions the shunt waveguide such that a first end of the shunt waveguide is in close proximity to a portion of the first bus waveguide and a second end of the shunt waveguide is in close proximity to a portion of the second bus waveguide. The first end and first waveguide portion collectively define a first adiabatic coupler and the second end and second waveguide portion collectively define a second adiabatic coupler, wherein each adiabatic coupler is substantially polarization independent. As a result, polarization-independent evanescent coupling is established between the shunt waveguide and each bus waveguide. In this state, the first input is optically coupled with the second output and optically decoupled with the first output and the second input is optically coupled with the first output and optically decoupled from the second output. As a result, in the ON state, a light signal injected at the first input is evanescently coupled from the first bus waveguide into the shunt waveguide and then evanescently coupled from the shunt waveguide into the second bus waveguide, while a light signal injected at the second input is evanescently coupled from the second bus waveguide into the shunt waveguide and then evanescently coupled from the shunt waveguide into the first bus waveguide.

Since the first bus waveguide and second bus waveguide are at different heights above the substrate, the actuator is dimensioned and arranged to move the ends of the shunt waveguide different distances in the vertical direction so that optical coupling can be established with both bus waveguides. In some embodiments, the actuator is a two-stage, cascaded electrostatic actuator that moves a first end of the shunt waveguide by a first distance and a second end of the shunt waveguide a second distance. In some embodiments, the actuator is a single-stage actuator operative for moving the shunt waveguide over the combined first and second distances. In some embodiments, the separation between the ends of the shunt waveguide and the bus waveguides is determined by mechanical standoffs disposed on the shunt waveguide and/or the bus waveguides.

In order to mitigate polarization sensitivity, embodiments of the present invention incorporate several design features into the bus and shunt waveguides, including:

i. providing the first and second bus waveguides in different waveguide layers such that no polarization-dependent crossing region connects them; or ii. each of the bus and shunt waveguides has a thick waveguide structure that enables low-loss propagation of both of the transverse electric and transverse magnetic polarization modes; or iii. the shunt waveguide is dimensioned and arranged such that it forms adiabatic couplers with the first and second bus waveguides when in its coupling position, where the adiabatic couplers are characterized by high coupling efficiency for both of the transverse electric and transverse magnetic polarization modes; or iv. edge couplers for coupling the input and first and second outputs to external optical waveguides (e.g., optical fibers, etc.) rather than commonly used grating couplers, which are known to have high polarization sensitivity; or v. any combination of i, ii, iii, and iv.

In some embodiments, at least one switching cell is a 1×2 switching cell that includes only one shunt waveguide.

Embodiments of the invention include switching cells that are arranged to collectively define a variety of optical circuit switches, including OXCs, WXCs, ROADMs, and cross-bar switches. In some embodiments, a plurality of switching cells is arranged and operatively coupled with a wavelength dispersive element to enable adding and/or dropping of individual wavelength signals into and out of a composite WDM signal. In some embodiments, a plurality of switching cells is arranged to switch all optical wavelengths of a composite WDM signal.

In some embodiments, an optical circuit switch includes integrated electronics. In some of these embodiments, the electronics includes circuit elements, such as CMOS devices, etc., which are monolithically integrated on the same substrate as the optical circuit switch. In some of these embodiments, the electronics includes circuit elements that are formed on a separate substrate, which is subsequently bonded or attached to the optical circuit switch substrate, with or without an interposer.

An embodiment of the present invention is an optical switching system (100) disposed on a substrate that defines a first plane (P1), the optical switching system comprising a first switching cell (102-1-1) that includes: a first bus waveguide (202-1) having a first input (IP1-1-1) and a first output (OP1-1-1), wherein the first bus waveguide is dimensioned and arranged to support propagation of a first light signal (116) comprising both transverse-electric (TE) and transverse-magnetic (TM) polarization modes, and wherein the first bus waveguide resides in a second plane (P2) that is parallel with the first plane; a second bus waveguide (202-2) having a second output (OP2-1-1), wherein the second bus waveguide is dimensioned and arranged to support propagation of the first light signal, and wherein the second bus waveguide resides in a third plane (P3) that is parallel with the first plane, the second and third planes being separated by a first separation (d1); and a first shunt waveguide (204-1) that is movable with respect to the substrate, wherein the first shunt waveguide is dimensioned and arranged to support propagation of the first light signal; wherein, when the first shunt waveguide is in a first position; (1) the first shunt waveguide is optically decoupled from each of the first and second bus waveguides, and (2) the first input is optically coupled with the first output and substantially optically decoupled from the second output; and wherein, when the first shunt waveguide is in a second position; (1) the first shunt waveguide is optically coupled with the first and second bus waveguides, and (2) the first input is substantially optically decoupled from the first output and optically coupled with the second output through the first shunt waveguide.

Another embodiment of the present invention is a method for forming an optical switching system (100) that is operative for switching a first light signal (116) comprising both transverse-electric (TE) and transverse-magnetic (TM) polarization modes, the method comprising: (a) forming a first switching cell (102-1-1), wherein the first switching cell is formed by operations comprising: (i) forming a first bus waveguide (202-1) on a substrate that defines a first plane (P1), the first bus waveguide having a first input (IP1-1-1) and a first output (OP1-1-1), wherein the first bus waveguide is dimensioned and arranged to support propagation of the first light signal, and wherein the first bus waveguide resides in a second plane (P2) that is parallel with the first plane; (ii) forming a second bus waveguide (202-2) having a second output (OP2-1-1), wherein the second bus waveguide is dimensioned and arranged to support propagation of the first light signal, and wherein the second bus waveguide resides in a third plane (P3) that is parallel with the first plane, the second and third planes being separated by a first separation (d1); (iii) forming a first shunt waveguide (204-1) that is movable with respect to the substrate, wherein the first shunt waveguide is dimensioned and arranged to support propagation of the first light signal; and (iv) forming a first actuator (206) that is operative for moving the first shunt waveguide between (1) a first position in which it is optically decoupled with the first and second bus waveguides and (2) a second position in which it is optically coupled with each of the first and second bus waveguides.

BRIEF DESCRIPTION OF THE DRAWINGS

FIGS. 6A-C depict simplified cross-sectional views of cell 102, taken through line a-a shown in FIG. 2A, at different points in its fabrication in accordance with the illustrative embodiment.

FIGS. 8A-B depict schematic drawings of directional coupler 212-1, taken through line a-a shown in FIG. 2A, in its unswitched and switched states, respectively.

FIGS. 9A-B depict schematic drawings of directional coupler 212-2, taken through line b-b shown in FIG. 2A, in its unswitched and switched states, respectively.

DETAILED DESCRIPTION

Figure 1:
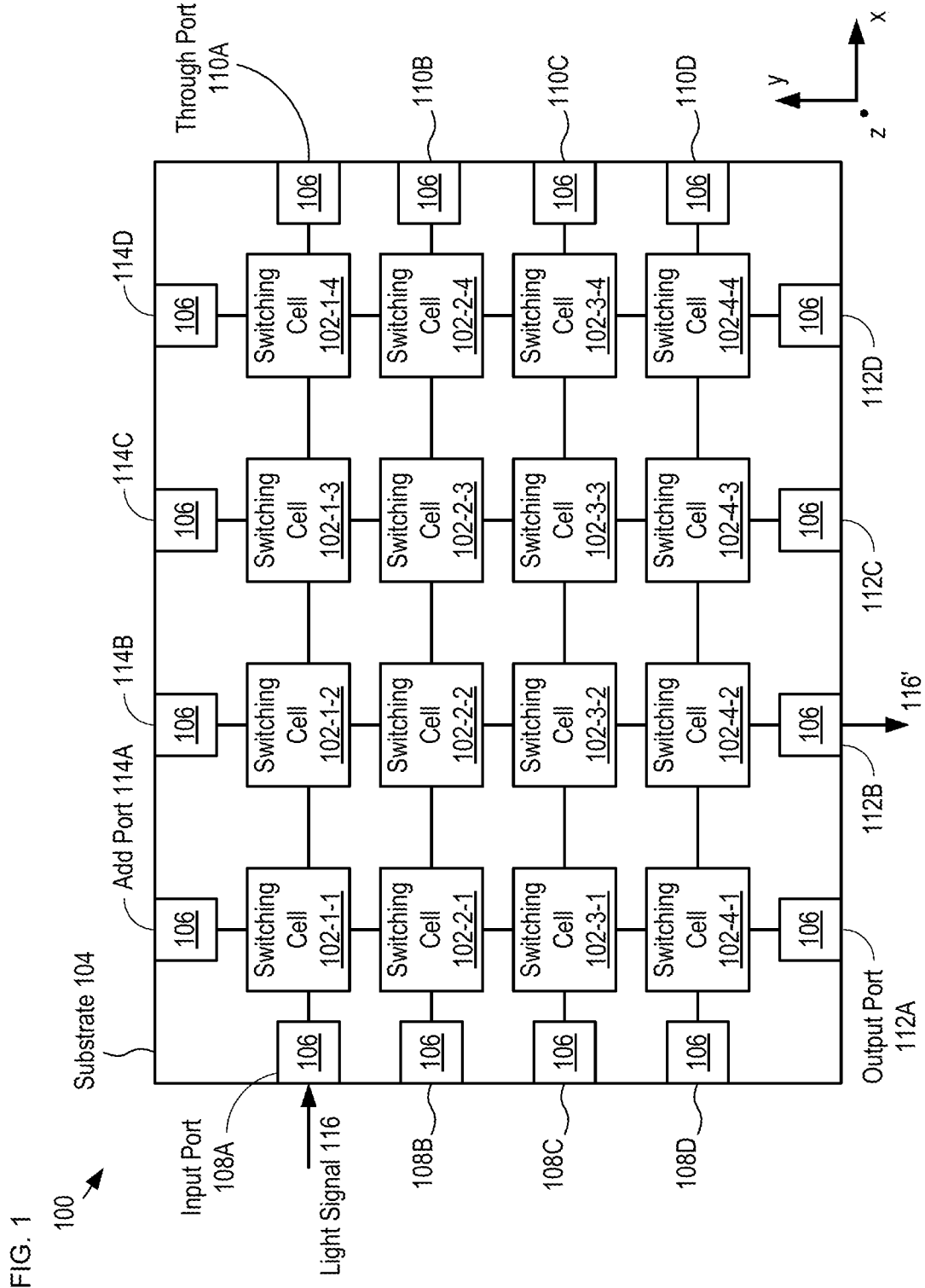
FIG. 1 depicts a schematic drawing of an optical switching system in accordance with an illustrative embodiment of the present invention.

FIG. 1 depicts a schematic drawing of an optical switching system in accordance with an illustrative embodiment of the present invention. System 100 is an optical cross-connect that includes a 4×4 array of switching-cells 102-1-1 through 102-4-4, each of which is disposed on substrate 104. It should be noted that, although the depicted example comprises three rows and four columns of switching cells, any practical number of rows and/or columns of switching cells can be included in system 100 without departing from the scope of the present invention.

Each of switching cells 102-1-1 through 102-4-4 (referred to, collectively, as cells 102) is a 2×2 crossbar switch that includes a pair of sub-micron-width bus waveguides and a pair of movable shunt waveguides, whose positions determine the connectivity of the inputs and outputs of the switching cell.

It is an aspect of the present invention that the silicon-photonic waveguides used in the switching cells of its different embodiments are dimensioned and arranged to enable propagation of light signals (e.g., light signal 116) that include both TE- and TM-polarization components such that each of these polarization components exhibits low propagation loss and the losses of the different polarization modes are substantially equal.

It should also be noted that switch architectures in accordance with this invention have only two significant sources of optical loss: (a) a one-time loss at the switching element used to reroute the light signal and (b) the propagation loss of the passive waveguides through which the light signal propagates. Losses attributable to a switching element is expected to be below 0.71 dB in some embodiments. In addition, it is expected that propagation loss below 1 dB/cm can achieve. Such performance would give rise to total on-chip loss of less than 2 dB with PDL of only 0.4 dB. As a result, optical switching systems in accordance with the present invention can be scaled to much larger port count than achievable in the prior art. One skilled in the art will recognize that the loss values are merely representative of the performance of a particular embodiment. It is expected that improved designs and/or improved fabrication processes will enable systems having improved performance, such as lower switching element loss, faster switching speeds, etc.

Cells 102 are optically coupled such that they collectively enable light signal 108, when injected into any of input ports 108A-108D, to be routed to its respective through port 110A-110D or, alternatively, to any of output ports 112A-112D. In the depicted example, optional add ports 114A-114D are included in system 100. As a result, cells 102 also enable a light signal 116 to be injected at any of add ports 114A-114D and be routed its respective output port 112A-112D or any of through ports 110A-110D (subject to blocking constraints). For exemplary purposes, in FIG. 1, light signal 116 is shown being coupled into input port 108A and exiting system 100 as light signal 116' from output port 112B.

Cells 102 are formed on substrate 104 via a combination of conventional photonic-integrated-circuit fabrication technology and wafer bonding, as discussed below. In the depicted example, substrate 104 is a silicon wafer; however, any suitable substrate material (e.g., glass, silicon carbide, silicon germanium, compound semiconductor, etc.) can be used in substrate 104 without departing from the scope of the present invention.

Edge Couplers 106 are portions of each of the bus waveguides of cell array 102 that are dimensioned and arranged to facilitate optical coupling between system 100 and one or more external devices (not shown) that are operatively coupled with the switching system to provide light signals to or receive light signal from bus waveguides 202. Edge couplers 106 are described in more detail below and with respect to FIG. 7A.

Figure 2A:
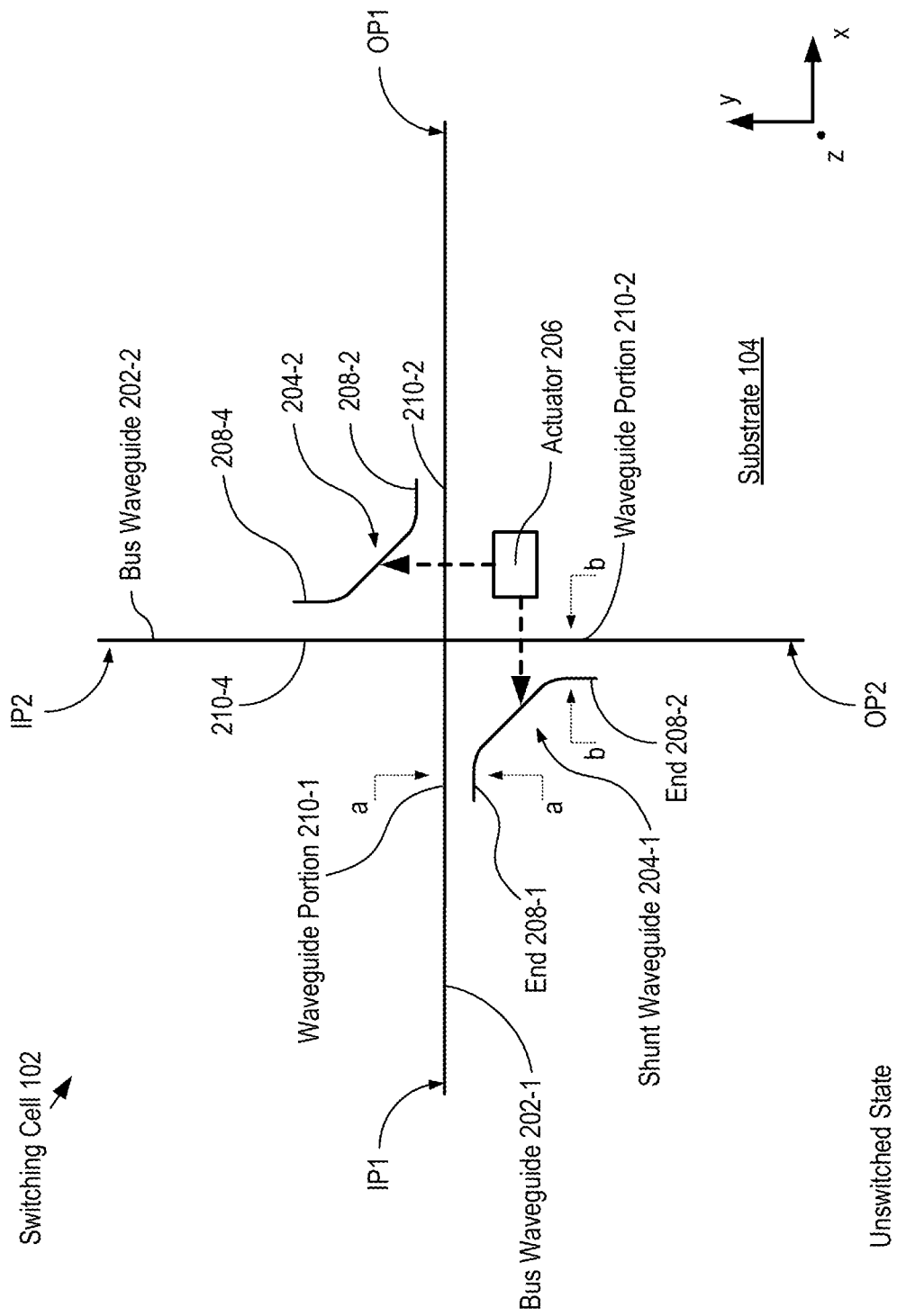
FIGS. 2A-B depict schematic drawings of a switching cell, in its unswitched and switched states, respectively, in accordance with the illustrative embodiment of the present invention.
Figure 2B:
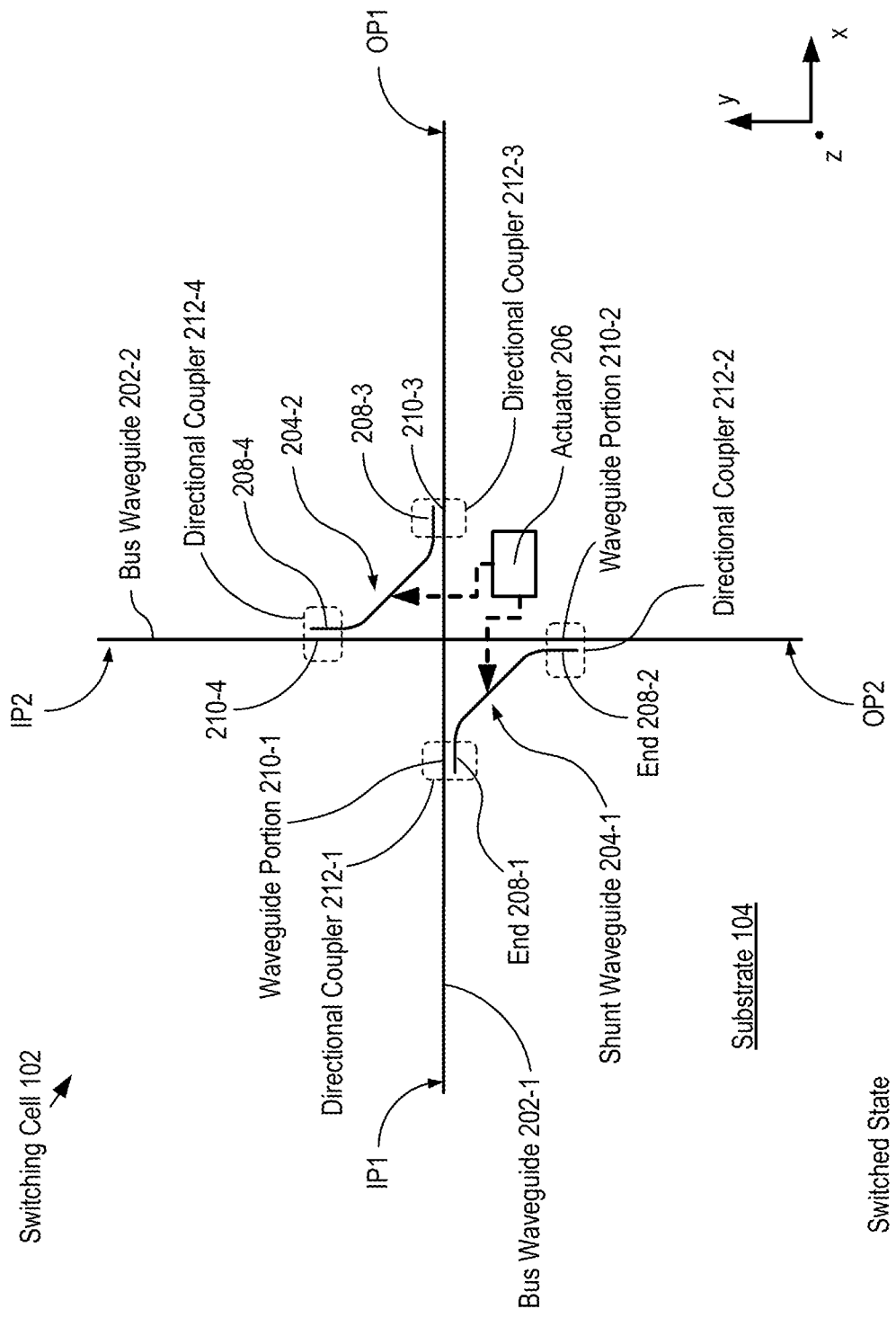

FIGS. 2A-B depict schematic drawings of a switching cell, in its unswitched and switched states, respectively, in accordance with the illustrative embodiment of the present invention. FIGS. 2A and 2B are simplified to facilitate demonstration of the operation of the switching cell.

Switching cell 202 includes bus waveguides 202-1 and 202-2, shunt waveguides 204-1 and 204-2, and actuator 206, each of which is disposed on common substrate 104. It should be noted that, while the depicted example is a switching cell that includes two shunt waveguides, in some embodiments, a switching cell includes only one shunt waveguide (i.e., either 204-1 or 204-2). For the purposes of this Specification, including the appended claims, the term "disposed on" is defined as "exists on or above" an underlying material or layer. This layer may comprise intermediate layers, such as transitional layers, necessary to ensure a suitable surface. For example, if a material is described to be "disposed (or grown) on a substrate," this can mean that at least a portion of the material is either (1) in intimate contact with the substrate; (2) in contact with one or more transitional layers that reside on the substrate; or (2) mechanically connected to material or an element that resides on the substrate.

Figure 3A:
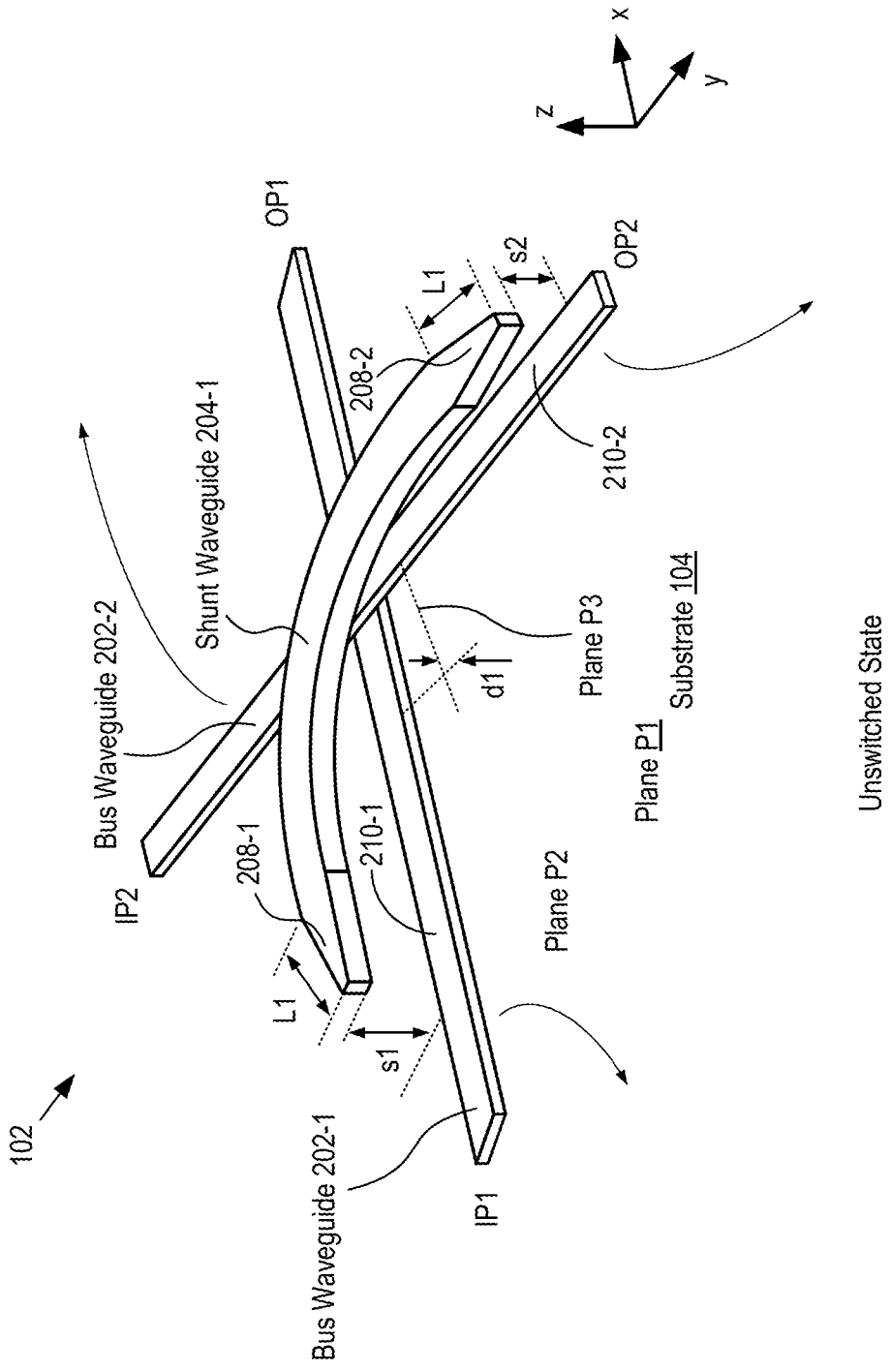
FIGS. 3A-B depict more detailed views of switching cell 202 in its unswitched and switched positions, respectively.
Figure 3B:
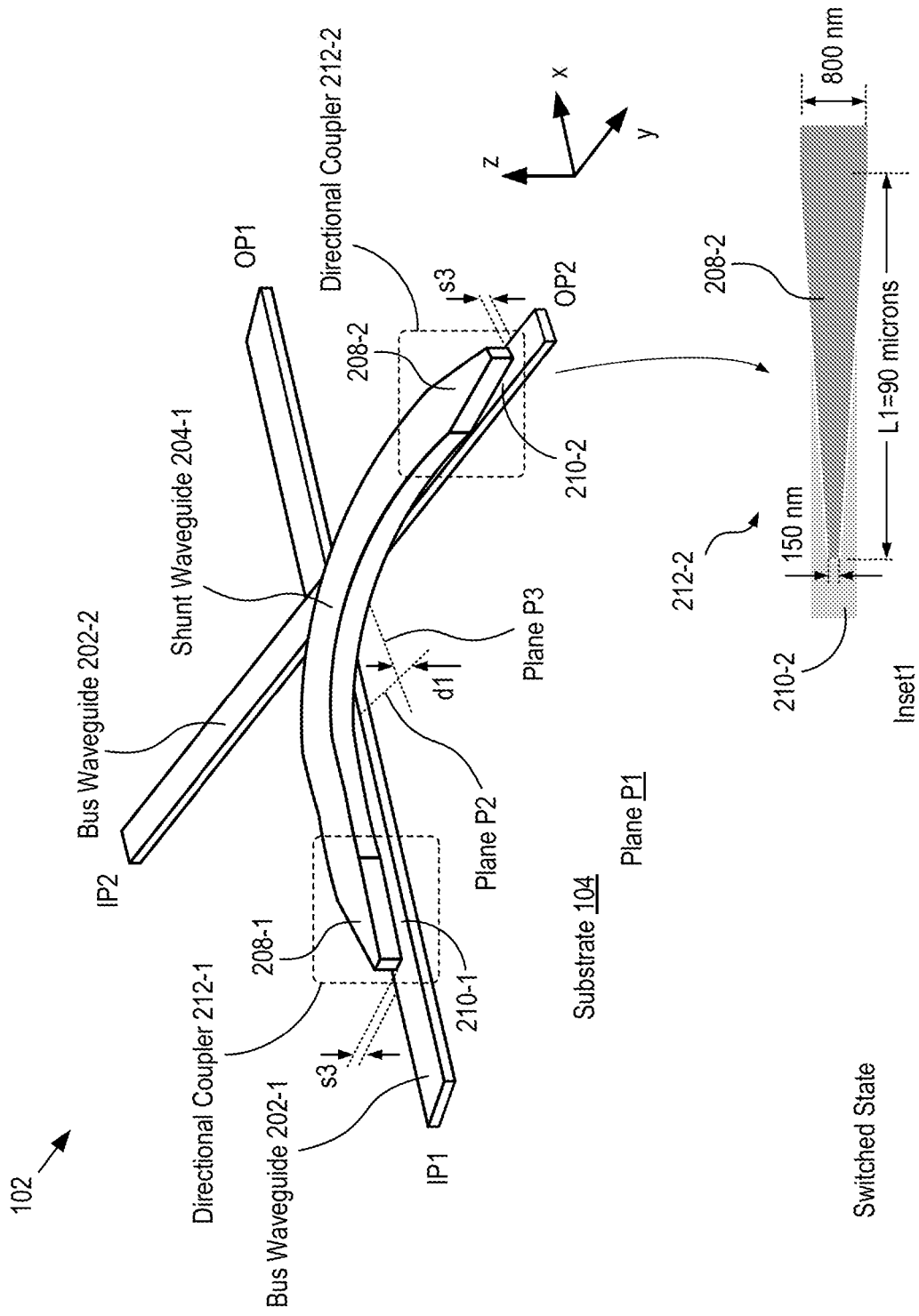

FIGS. 3A-B depict more detailed views of switching cell 202 in its unswitched and switched positions, respectively. For clarity, actuator 206 is excluded and only shunt waveguide 204-1 is depicted in FIGS. 3A-B.

Each of bus waveguides 202-1 and 202-2 (referred to, collectively, as bus waveguides 202) is a ridge waveguide having a core of single-crystal silicon. In contrast to prior-art silicon-photonic optical switching systems, bus waveguides 202 are dimensioned and arranged to enable both low-loss propagation and high coupling efficiency for both TE- and TM-modes. In some embodiments, each of bus waveguides 202-1 and 202-2 has a thickness that is significantly greater than the thicknesses of bus waveguides of prior-art optical switching systems.

Figure 4A:
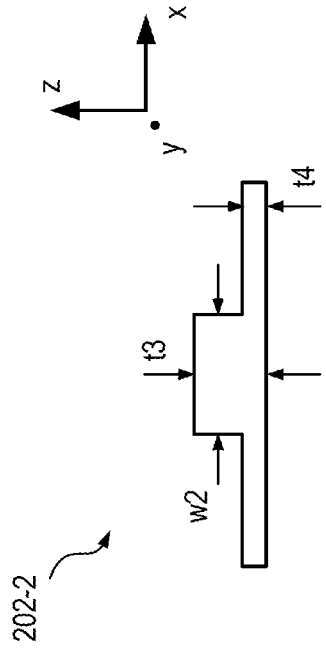
FIGS. 4A-B depict schematic drawings of cross-sectional views of bus waveguides 202-1 and 202-2, respectively.
Figure 4B:
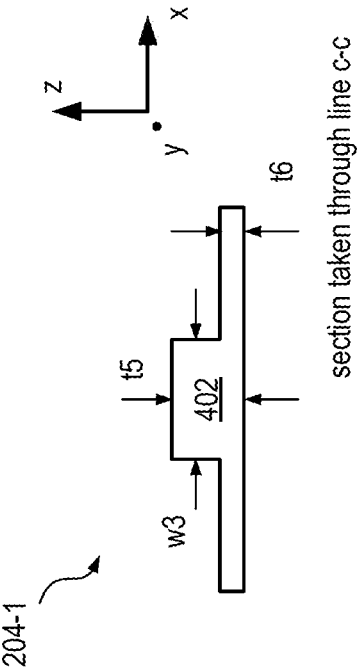

FIGS. 4A-B depict schematic drawings of cross-sectional views of bus waveguides 202-1 and 202-2, respectively.

In the depicted example, bus waveguide 202-1 has a total thickness, t1, of approximately 320 nm and a waveguide width, w1, of 550 nm. The wing regions of bus waveguide 202-1 have a thickness, t2, of approximately 100 nm; therefore, the ridge portion of bus waveguide 202-1 has a height of approximately 220 nm. Typically, the wing regions of ridge waveguides used in embodiments of the present invention is a few microns (e.g., 2-3 microns); however, any of the wing regions can have any practical width.

Bus waveguide 202-2 has a total thickness, t3, of approximately 340 nm and a width, w2, of 550 nm. The wing regions of bus waveguide 202-2 also have a thickness, t4, of approximately 100 nm; therefore, the ridge portion of bus waveguide 202-2 has a height of approximately 240 nm. Typically, the thicknesses of the bus waveguides are slightly different to accommodate that fact that bus waveguide 202-1 resides directly on an underlying oxide cladding layer while bus waveguide 202-2 is suspended in air over much of its length.

Figure 4C:
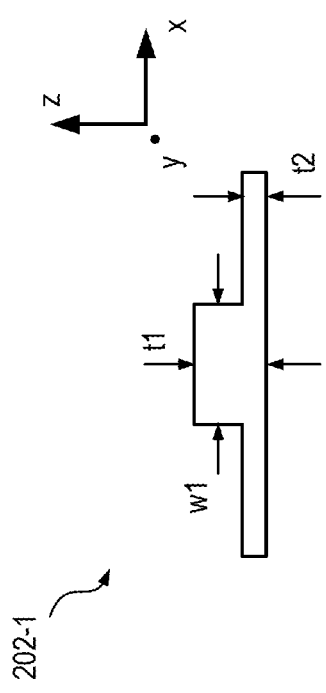
FIGS. 4C-D depict schematic drawings of top and sectional views, respectively, of shunt waveguide 204-1.
Figure 4D:
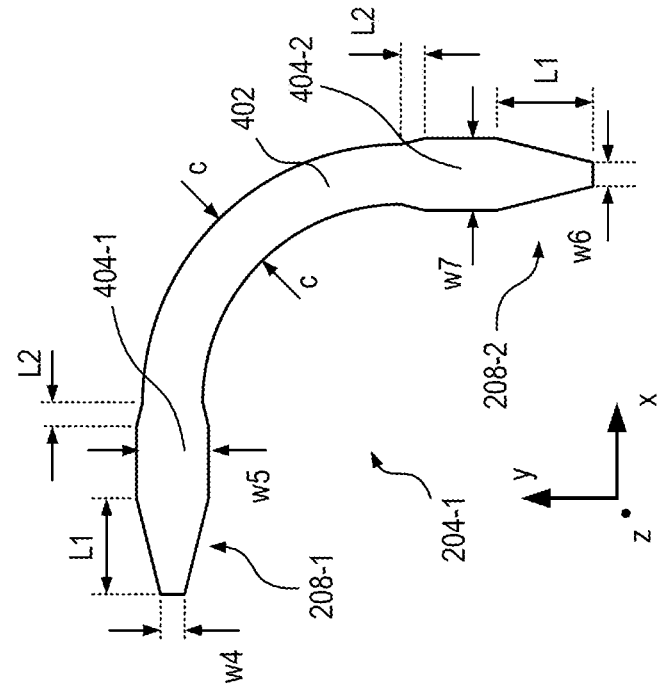

FIGS. 4C-D depict schematic drawings of top and sectional views, respectively, of shunt waveguide 204-1. Shunt waveguide 204-1 is representative of shunt waveguide 204-2. The sectional view shown in FIG. 4D is taken through line c-c of FIG. 4C.

Each of shunt waveguides 204-1 and 204-2 is also a ridge waveguide that includes curve 402, straight portions 404-1 and 404-2, and ends 208-1 and 208-2. Shunt waveguides 204-1 and 204-2 comprise polysilicon; however, other materials can be used for the shunt waveguides without departing from the scope of the present invention. Each of shunt waveguides 204-1 and 204-2 has a total thickness, t5, of approximately 380 nm and wing regions having thickness, t6, of approximately 100 nm; therefore the ridge portion of the shunt waveguides have a height of approximately 280 nm.

Curved portion 402 has width, w3, of approximately 600 nm. As a result, curved portion 402 functions as a single-mode waveguide for light signal 116. Single-mode operation is preferred for curved portion to mitigate bending losses through its 90° bend.

Ends 208-1 and 208-2 are coupled with curved portion 402 via straight portions 404-1 and 404-2, respectively. End 208-1 tapers over length L1 from width, w4, at its tip to width, w5, of straight portion 404-1. In similar fashion, end 208-2 tapers over length L1 from width, w6, at its tip to width, w7, of straight portion 404-2. In the depicted example, each of widths w4 and w6 is 150 nm, width w5 is 850 nm, width w7 is 800 nm, and L1 is equal to 90 microns. It is an aspect of the present invention that tapering ends 208-1 and 208-2 differently accommodates the differences in waveguide portions 210-1 and 210-2, respectively, which enables both TE- and TM-modes of light signal 116 to efficiently couple through adiabatic couplers 212-1 and 212-2.

Since straight portions 404-1 and 404-2 have no bending losses and they are relatively short, these waveguide portions can function as multi-mode waveguides and, therefore, can have large widths than curved portion 402. Each of the straight portions is joined with curved portion 402 via relatively shorter tapers having length, L2, which is approximately 50 microns in the depicted example.

Although the illustrative embodiment comprises bus and shunt waveguides that are ridge waveguides, it will be clear to one skilled in the art, after reading this Specification, how to specify, make, and use alternative embodiments of the present invention wherein at least one of the bus waveguides and shunt waveguides is a different type of waveguide, such as channel waveguide, etc. One skilled in the art will recognize that the desired shape of ends 208 is dependent upon the specific waveguide designs used for the bus and shunt waveguides and, as a result, different end shapes can be used without departing from the scope of the present invention.

Shunt waveguides 204-1 and 204-2 are operatively coupled with actuator 206, which is operative for moving the shunt waveguides between a first position in which they are optically decoupled from both bus waveguides and a second position in which their ends are optically coupled with portions of both bus waveguides to define adiabatic directional couplers 212-1 and 212-2. A schematic drawing of a top view of directional coupler 212-2 is provided in FIG. 3B as Inset1.

Actuator 206 is a MEMS-based actuator that is mechanically coupled with shunt waveguides 204-1 and 204-2 such that the actuator controls the position of ends 208 relative to bus waveguides 202. As discussed below and with respect to FIGS. 8A-B and 9A-B, in the illustrative embodiment, actuator 206 is a two-stage vertical electrostatic actuator that controls the height of each shunt waveguide above its respective bus waveguide. For clarity, the vertical separation between ends 208 and waveguide portions 210 is represented as a lateral separation in FIGS. 2A-B. Although the illustrative embodiment comprises a vertical electrostatic actuator, it will be clear to one skilled in the art, after reading this Specification, how to specify, make, and use any actuator suitable for controlling the separation between ends 208 and waveguide portions 210. Actuators suitable for use in the present invention include, without limitation, vertical actuators, lateral actuators, and actuators that actuate both vertically and laterally. Further, actuators in accordance with the present invention include, without limitation, electrothermal, thermal, magnetic, electromagnetic, electrostatic comb-drive, magnetostrictive, piezoelectric, fluidic, pneumatic actuators, and the like. Actuator 206 is described in more detail below and with respect to FIGS. 8A-B and 9A-B.

It is an aspect of the present invention that, in contrast to prior-art optical switching systems, bus waveguides 201-1 and 202-2 are formed in different planes such that they are optically isolated from one another when the switching cell is in its unswitched state. As a result, embodiments of the present invention avoid polarization-dependent crossing loss at junctions between bus waveguides formed in the same waveguide layer, as occurs in prior-art optical switching systems. Specifically, the top surface of substrate 104 defines a first plane—plane P1, bus waveguide 202-1 is formed in plane P2, and bus waveguide 202-1 is formed in plane P3, all of which are parallel. Planes P2 and P3 are separated by distance d1, which, in the depicted example, is equal to approximately 1.38 micron. As a result, the separation between the top surface of bus waveguide 202-1 and the bottom surface of bus waveguide 202-2 is approximately 1 micron.

When switching cell 202 is in its unswitched state (FIGS. 2A and 3A), ends 208 are separated from waveguide portions 210 by distances sufficiently large to ensure that no evanescent coupling occurs between them. In this state, input port IP1 is optically coupled with output port OP1 and input port IP2 is optically coupled with output port OP2. In other words, light entering the switching cell at IP1 will propagate directly to OP1 with low loss, while light entering the switching cell at IP2 will propagate directly to OP2 with low loss.

When switching cell 202 is in its switched state (FIGS. 2B and 3B), ends 208 and their respective waveguide portions 210 collectively define adiabatic directional couplers 212. Specifically, end 208-1 and waveguide portion 210-1 collectively define adiabatic directional coupler 212-1, end 208-2 and waveguide portion 210-2 collectively define adiabatic directional coupler 212-2, and so on. As a result, a light signal entering IP1 evanescently couples into shunt waveguide 204-1 at directional coupler 212-1 and propagates through shunt waveguide 204-1 to directional coupler 212-2, where it evanescently couples into bus waveguide 202-2 and propagates to OP2. In similar fashion, a light signal entering IP2 evanescently couples into shunt waveguide 204-2 at directional coupler 212-4 and propagates through shunt waveguide 204-2 to directional coupler 212-3, where it evanescently couples into bus waveguide 202-1 and propagates to OP1.

Figure 5:
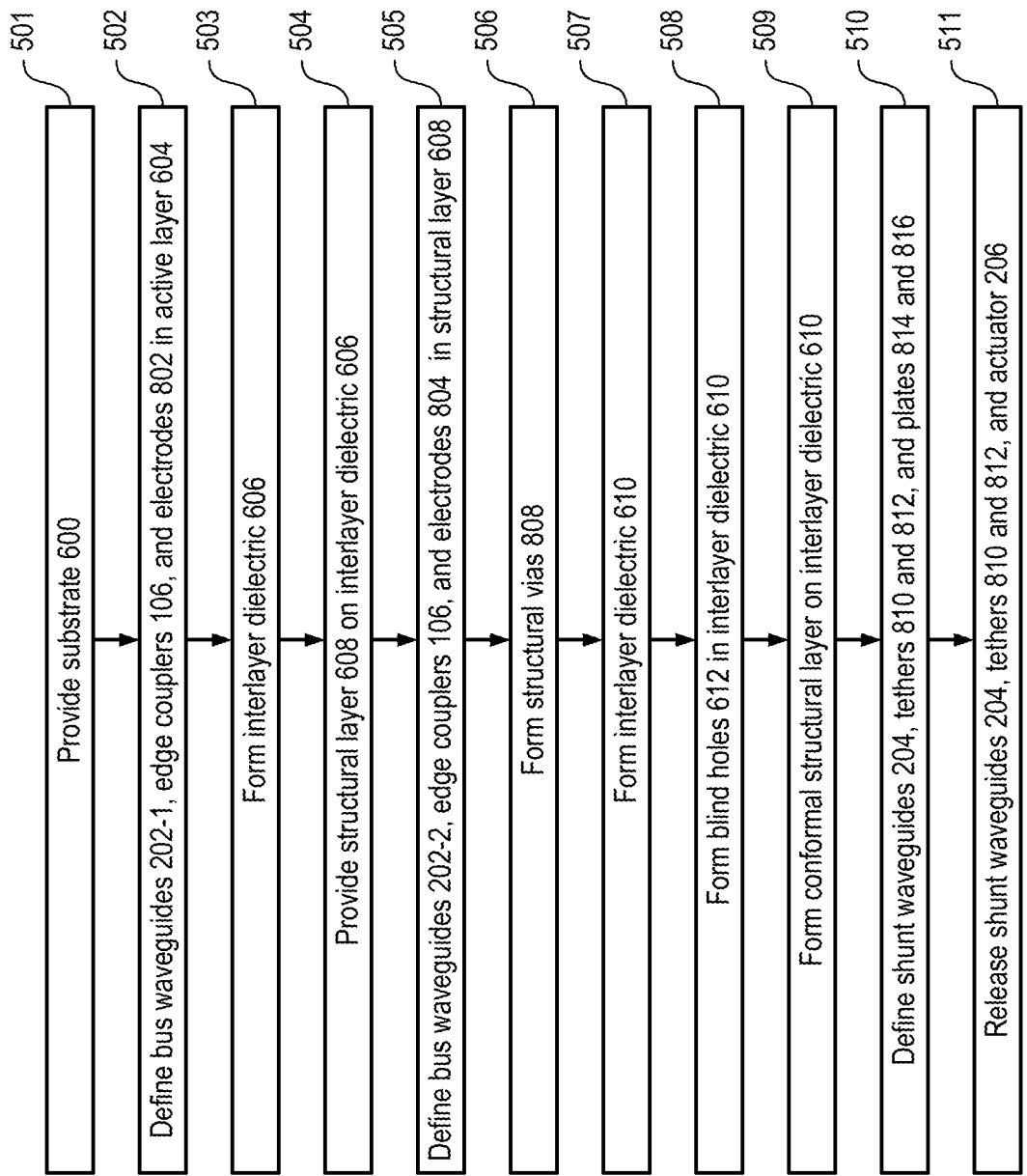
FIG. 5 depicts operations of a method suitable for forming an optical switching system in accordance with the illustrative embodiment.

FIG. 5 depicts operations of a method suitable for forming an optical switching system in accordance with the illustrative embodiment. Method 500 is described herein with continued reference to FIGS. 1-4 as well as with reference to FIGS. 6-9.

FIGS. 6A-C depict simplified cross-sectional views of cell 102, taken through line a-a shown in FIG. 2A, at different points in its fabrication in accordance with the illustrative embodiment.

Method 500 begins with operation 501, wherein substrate 600 is provided. Substrate 600 is a conventional silicon-on-insulator (SOI) substrate comprising handle substrate 104, buried oxide (BOX) layer 602, and active layer 604, where the BOX layer 602 has a thickness of approximately 3 microns and active layer 604 has a thickness of approximately 320 nm.

At operation 502, bus waveguides 202-1, edge couplers 106, and electrodes 702 are defined in active layer 604. Since the bus waveguides are ridge waveguides, this operation requires two steps, one in which the entire width of the waveguides is defined by etching completely through active layer 604 and another in which the ridge portion of the waveguide is defined by partially etching active layer 604 to form the wing regions of the waveguide structure. It should be noted that these steps can be performed in either order.

In each step, the desired pattern to be transferred into active layer 604 is first defined as an etch mask using conventional photolithography. The pattern of the etch mask is then transferred into the active region using a suitable etch process, such as reactive-ion etching (RIE), deep reactive-ion etching (DRIE), and the like. It should be noted that other lithography methods, such as x-ray lithography, e-beam lithography, imprint lithography, etc. can be used to define the etch mask.

It is an aspect of the present invention that the use of edge couplers to couple light into or out of bus waveguides 202 affords embodiments of the present invention significant advantages over prior-art optical switching systems, which typically employ grating couplers to couple light signals into and out of the system. Unfortunately, grating couplers are highly polarization-sensitive. As a result, by employing edge couplers, particularly those comprising spot-size converters, embodiments of the present invention realize substantially polarization insensitive optical coupling with external devices, such as optical fibers, lasers, and photodetectors.

During operation 502, a first set of edge couplers 106 is formed as part of a subset of bus waveguides 202-1—specifically, those bus waveguides 202-1 that define either an input port 108 or through port 110.

Figure 7A:
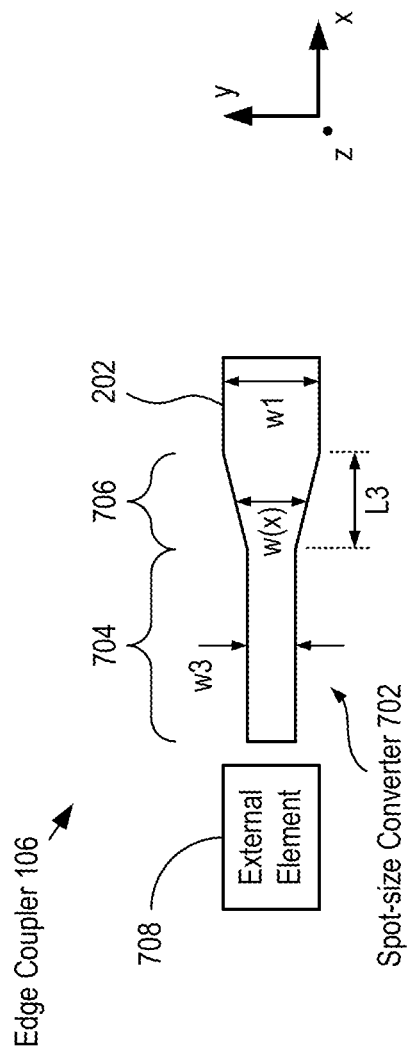
FIGS. 7A-B depict schematic drawings of top and cross-sectional views of a representative edge coupler 106.
Figure 7B:
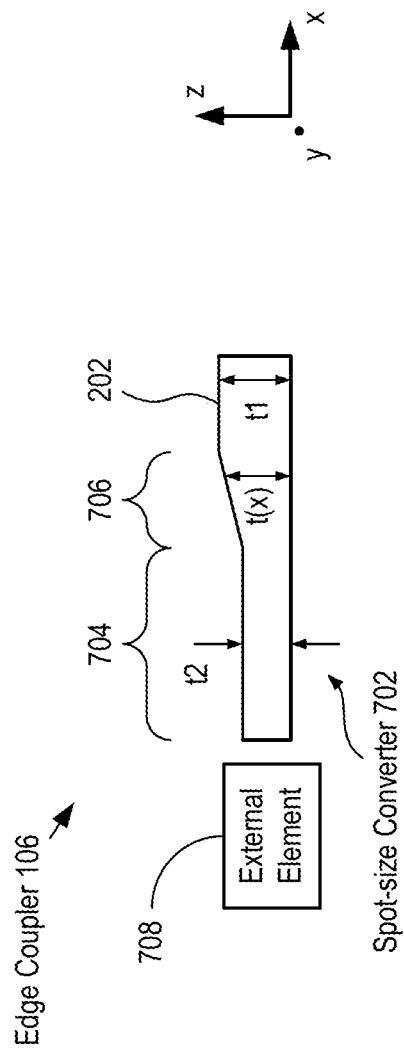

FIGS. 7A-B depict schematic drawings of top and cross-sectional views of a representative edge coupler 106. Edge coupler 106 includes spot-size converter 702, which comprises coupling portion 704 and taper region 706. Edge couplers terminate their respective bus waveguides 202 in a manner that mitigates optical coupling loss between that bus waveguide and its respective external element 708. For exemplary purposes, FIGS. 7A-B depict an edge coupler for coupling a bus waveguide 202-1 to external element 708. In the depicted example, each of input ports 108, through ports 110, output ports 112, and add ports 114 is optically coupled with a conventional optical fiber (not shown in FIG. 1); therefore, external element 708 is a conventional optical fiber operative for conveying light signal 116. In some embodiments, external element 708 is a different optical component or device, such as a specialty fiber (e.g., high-numerical aperture (NA) fiber, lensed fiber, etc.), laser, photodetector, another PIC, and the like.

Coupling portion 704 is a waveguide region whose width and thickness are selected such that the waveguide has a mode-field profile that substantially matches that of external element 708.

Taper region 706 is a region of a bus waveguide whose width and thickness are tapered over length, L3, between the bus-waveguide width, w1 and thickness, t1, to width, w8, and thickness, t7, of coupling portion 704. One skilled in the art will recognize that the width/thickness can be tapered up (called normal taper) or tapered down (called inverse taper) based upon design considerations. Although both the width and thickness of taper region 706 are tapered in the depicted example, in some embodiments, only one of width or thickness is tapered. Furthermore, although taper region 704 is depicted as having a linear profile, one skilled in the art will recognize, after reading this Specification, that a taper region can have a different taper profile, such as non-linear, piecewise linear, etc.

At operation 503, interlayer dielectric 606 is formed over bus waveguides 202-1 and planarized (e.g., via chemical-mechanical polishing (CMP), etc.) to its desired thickness. Typically, interlayer dielectric 606 is formed via deposition of a low-temperature oxide (LTO) with a thickness of approximately 1 micron; however, other processes and/or thicknesses can be used.

At operation 504, structural layer 608 is provided on interlayer dielectric 606 such that the structural layer has a thickness of approximately 340 nm. In the depicted example, structural layer 608 is the active layer of a second SOI substrate, which is bonded to interlayer 606 using a suitable bonding process, such as oxygen-assisted plasma bonding. After the bonding operation, the BOX layer and handle substrate of the second SOI substrate are removed, thereby exposing structural layer 608 in preparation for subsequent processing operations.

At operation 505, structural layer 608 is patterned to define bus waveguides 202-2 and their respective edge couplers 106, which are located around the perimeter of system 100 to define output ports 112 and add ports 114, as well as electrodes 804, which are part of actuator 206. Bus waveguides 202-2, their respective edge couplers 106, and electrodes 804 are defined as described above, vis-à-vis operation 502.

FIG. 6A depicts a cross-sectional view of switching cell 202, taken through line a-a as depicted in FIG. 3A, after definition of bus waveguides 202-1 and 202-2.

It should be noted that operation 505 exposes bus waveguides 202-1 and electrodes 802 and 804. Once exposed, electrodes 802 and 804 are typically made more conductive by doping them using ion implantation or another suitable doping method. Furthermore, in some embodiments, areas of interlayer dielectric 606 that are exposed near these electrodes are coated with encapsulation layer 818 during operation 505. In the depicted example, encapsulation layer comprises a thin (e.g., 20 nm) layer of suitable material, such as aluminum oxide, which protects the oxide around electrodes 802 and 804 so that they are not completely undercut and destroyed during the release etch used to make waveguides 204 and actuator 206 movable relative to substrate 104.

At operation 506, structural vias 808 are optionally formed between bus waveguides 202-1 and 202-2. As discussed below, much of the length of bus waveguides 202-2 is undercut by the release etch. These structural vias provide mechanical strength to bus waveguides 202-2 after this release operation. In addition, some of vias 808 are used to provide electrical interconnectivity to features (e.g., electrodes) formed in one or both of active layer 604 and structural layer 608.

At operation 507, interlayer dielectric 610 is formed over the surface of the device. Interlayer dielectric 610 is formed by depositing a layer of LTO and using CMP to create a flat, one-micron-thick dielectric layer on top of bus waveguides 202-2.

At operation 508, blind holes 612 and through holes 806 are formed in interlayer dielectric 610. Blind holes 612 are etched into the top surface of interlayer dielectric 610 to a depth, h3. In the depicted example, h3 is equal to 80 nm, which determines the coupling distance for adiabatic couplers 312. Through holes 806 extend through the thickness of interlayer dielectric 610 and expose surface regions of structural layer 608.

FIG. 6B depicts a cross-sectional view of switching cell 202 after definition of blind holes 612.

At operation 509, structural layer 614 is formed on interlayer dielectric 610. In the depicted example, structural layer 614 is a layer of undoped polysilicon having a thickness of approximately 380 nm, which is deposited in a conformal fashion. Structural layer 614 is then typically annealed to improve its transmissivity for light signal 116. Although the illustrative embodiment includes a structural layer that comprises polysilicon, it will be clear to one skilled in the art, after reading this Specification, how to specify, make, and use alternative embodiments wherein structural layer 614 includes a different structural material. Materials suitable for use in structural layer 614 include, without limitation, amorphous silicon, hydrogenated amorphous silicon, dielectric materials (e.g., silicon nitride, etc.), and the like.

Due to the conformal nature of structural layer 614, during operation 510, the material of structural layer 614 fills blind holes 612 and through holes 806, thereby forming stand-offs 616 and anchors 820.

Stand-offs 616 project from the bottom surfaces of each shunt waveguide by a distance of s3. When switching cell 202 is in its switched state, standoffs 616 contact each bus waveguides, thereby establishing the desired coupling distance, s3, of adiabatic directional couplers 312-1 and 312-2.

Anchors 820 support patterned structural layer 614 above bus waveguides 202.

At operation 510, shunt waveguides 204, tethers 810 and 812, and plates 814 and 816 are defined in structural layer 614, as described above with respect to bus waveguides 202. Tethers 810 and 812 are dimensioned and arranged to enable vertical motion of shunt waveguide 204-1 in response to a suitable voltage applied between the electrodes and plates that collectively define actuator 206 (i.e., electrodes 802 and 804 and plates 814 and 816).

At operation 511, the portions of structural layer 614 containing shunt waveguides 204, tethers 810 and 812, and plates 814 and 816 are "released" (i.e., made movable relative to substrate 104) by removing portions of interlayer dielectrics 606 and 610. In the depicted example, the release etch used in operation 511 is a conventional vapor-phase HF etch.

FIG. 6C depicts a cross-sectional view of switching cell 202 after operation 511.

FIGS. 8A-B depict schematic drawings of directional coupler 212-1, taken through line a-a shown in FIG. 2A, in its unswitched and switched states, respectively.

Structural layer 614 is held above structural layer 608 via polysilicon stand-offs 806. As noted above, structural layer 608 is patterned to define shunt waveguide 204-1, whose end 208-1 is mechanically coupled with actuator 206 by tethers 312.

Actuator 206 is a two-stage, vertical electrostatic actuator that is operative for moving ends 208-1 and 208-2 different distances. Actuator 206 comprises electrodes 804 and plates 814, which collectively define stage1 of the actuator, as well as electrodes 802 and plates 816, which collectively define stage2 of the actuator. End 208-1 of shunt waveguide 204-1 is part of a platform that includes plates 816. Plates 816 are mechanically coupled with plates 814 via tethers 812. Plates 814 are mechanically coupled with plates 814 via tethers 810, which extend from anchors 820.

When no voltage is applied between structural layer 614 and electrodes 802 and 804, end 208-1 remains in its quiescent position in which it is separated from waveguide portion 210-1 bus waveguide 202-1 by distance s1.

When a sufficient voltage is applied between structural layer 614 and electrodes 802 and 804, plates 814 are electrostatically attracted toward electrodes 804. As a result, plates 816 and end 208-1 move downward toward substrate 104 (by virtue of the flexibility of tethers 810) until standoffs 616 make contact with the top surface of structural layer 608. At this point stage1 of actuator 206 is fully actuated, which reduces the spacing between electrodes 802 and plates 816, thereby enabling a second electrostatic force in stage2 of actuator 206.

The second electrostatic force attracts plates 816 to electrodes 802 (by virtue of the flexibility of tethers 812) and end 208-1 is drawn toward waveguide portion 210-1 until standoffs 616 contact the top surface of active layer 604. The thickness of standoffs 616, s3, establishes the desired coupling distance between end 208-1 and waveguide portion 210-1, which enables evanescent coupling of light signal 116 from bus waveguide 202-1 into shunt waveguide 204-1 at directional coupler 212-1.

It should be noted that, although the depicted example employs a two-stage, cascaded actuator, other actuators can be used in embodiments of the present invention without departing from its scope. For example, a more conventional single-stage actuator that comprises plates 816 and 802 can be used. In some cases, a higher voltage might be required for a single stage actuator; however, larger actuator areas can also be used, which would mitigate this need.

FIGS. 9A-B depict schematic drawings of directional coupler 212-2, taken through line b-b shown in FIG. 2A, in its unswitched and switched states, respectively.

Directional coupler 212-2 is analogous to directional coupler 212-1; however, because much less vertical travel of end 208-2 of shunt waveguide 204-1 is necessary to enable evanescent coupling with waveguide portion 210-2, actuator 206 requires only stage1 (i.e., electrodes 804 and plates 814).

When no voltage is applied between electrodes 804 and plates 814, end 208-2 remains in its quiescent position and is separated from bus waveguide 202-2 by distance s2.

Distance s2 is sufficiently large to ensure that no evanescent coupling occurs between the two waveguides.

When a sufficient voltage is applied between electrodes 802 and plates 814, however, the plates are electrostatically attracted toward the electrodes, drawing end 208-2 toward waveguide portion 210-2 until standoffs 616 make contact with the top surface of structural layer 608. As noted above, the thickness of the standoffs establishes the proper coupling distance s3 for directional coupler 212-2, thereby enabling evanescent coupling of light signal 116 from shunt waveguide 204-1 into bus waveguide 202-2.

Figure 10:
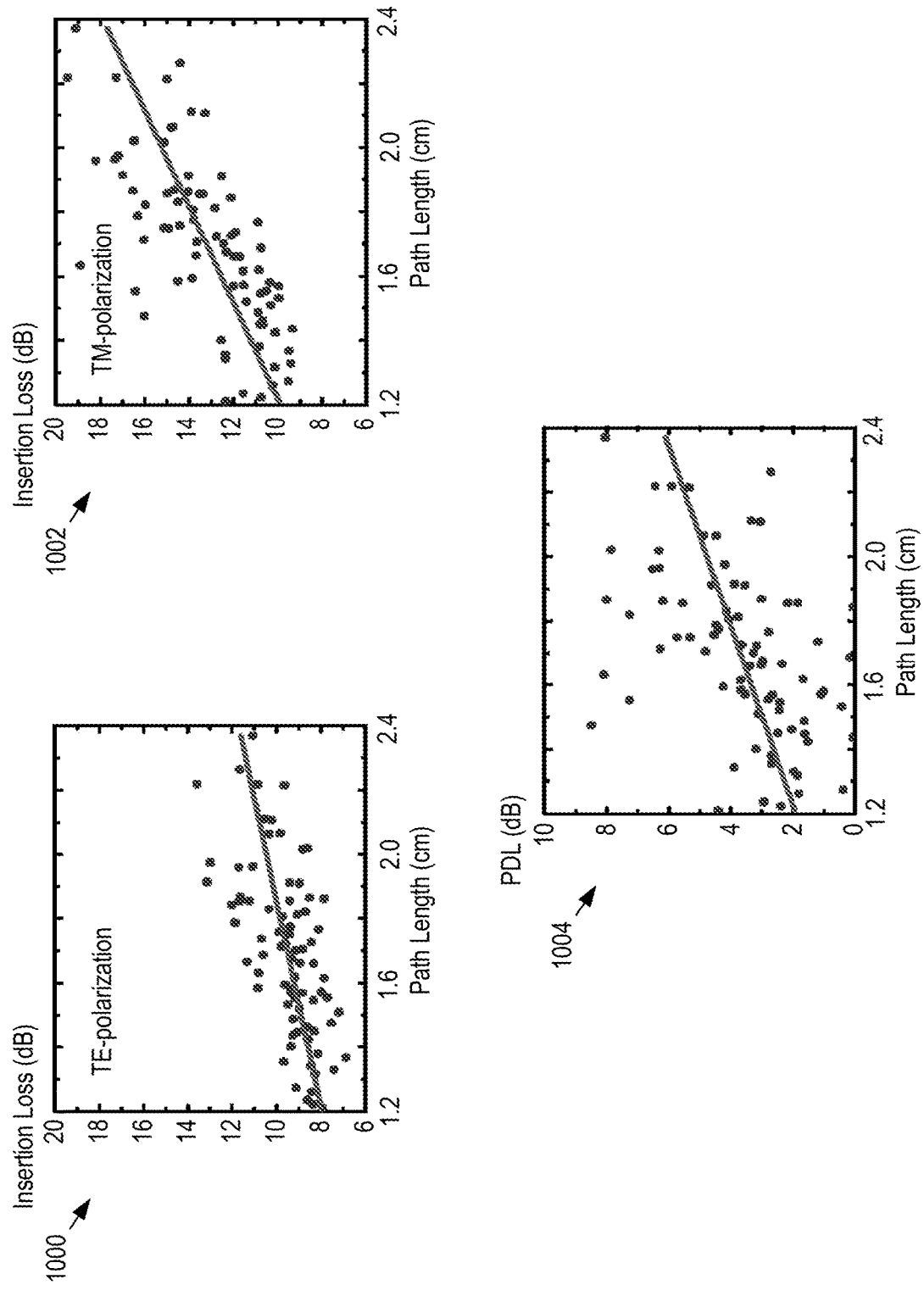
FIG. 10 depicts measured insertion loss for TE-polarized light and TM-polarized light, respectively, through a plurality of paths through an optical switching system in accordance with the present invention.

FIG. 10 depicts measured insertion loss for TE-polarized light and TM-polarized light, respectively, through a plurality of paths through an optical switching system in accordance with the present invention.

Plot 1000 shows measured loss for TE-polarized light conveyed through propagation paths ranging in length from 1.2 cm to 2.4 cm. The maximum on-chip insertion loss measured was 13.6 dB. Propagation loss, derived from the slope of the linear fit indicated in plot 1000, was determined to be approximately 3.1 dB/cm. This equates to approximately 0.046 dB/switching cell.

A switching loss of approximately 4.22 dB was estimated from the y-intercept of the linear fit.

Plot 1002 shows measured loss for TM-polarized light conveyed through propagation paths ranging in length from 1.2 cm to 2.4 cm. The maximum on-chip insertion loss measured was 19.5 dB and propagation loss was estimated to be approximately 6.7 dB/cm (approximately 0.098 dB/switching cell). Switching loss for TM-polarized light was estimated at approximately 1.85 dB.

A maximum PDL was estimated as 8.5 dB, the majority which arises from the difference in propagation loss of TE- and TM-polarization modes. Since this loss is mainly due to sidewall roughness, it is believed that an improved waveguide-fabrication process will result in further improvements.

Plot 1004 shows the path-length dependence of the PDL. The contributions of the PDL arising from the waveguides is estimated as 3.5 dB/cm, while the loss due to the switching elements themselves is estimated as 2.4 dB. It should be noted that the measured losses are higher than the theoretical values, which is believed to be primarily due to fabrication imperfections. Improved processes and/or advances in foundry capabilities should lead to lower losses in the future.

Figure 11:
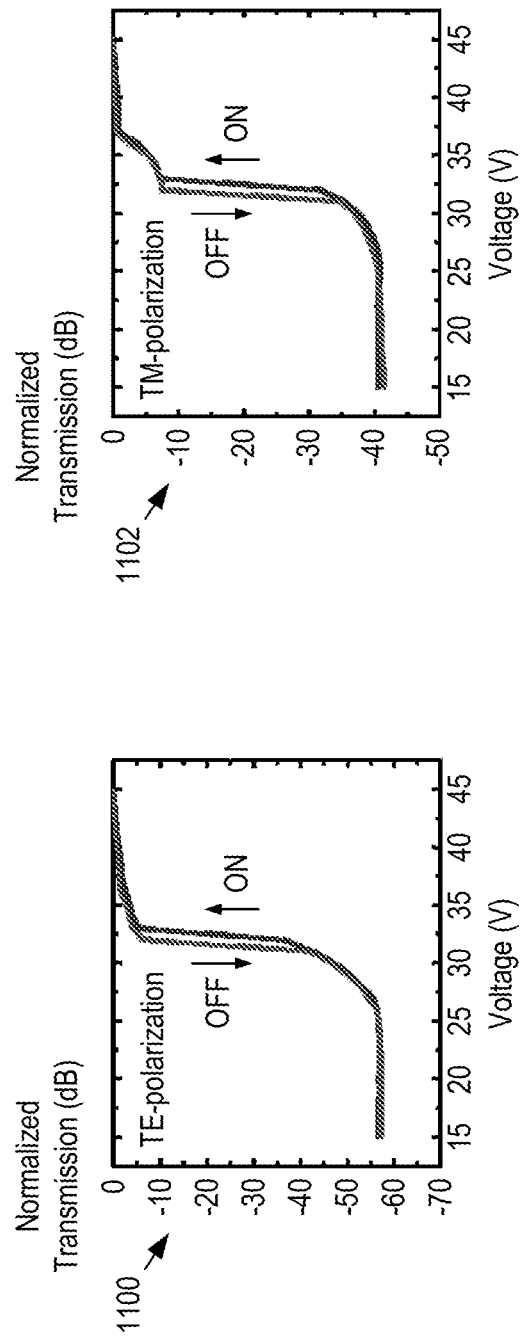
FIG. 11 depicts measured voltage responses of a switching cell for each of the TE- and TM-polarization modes in accordance with the present invention.

FIG. 11 depicts measured voltage responses of a switching cell for each of the TE- and TM-polarization modes in accordance with the present invention.

Plots 1100 and 1102 demonstrate that both TE- and TM-polarization modes turn on at an applied voltage of approximately 40 V and turn off when the applied voltage drops to 25 V. Furthermore, both polarization modes exhibit extinction ratios greater than 40 dB.

Figure 12:
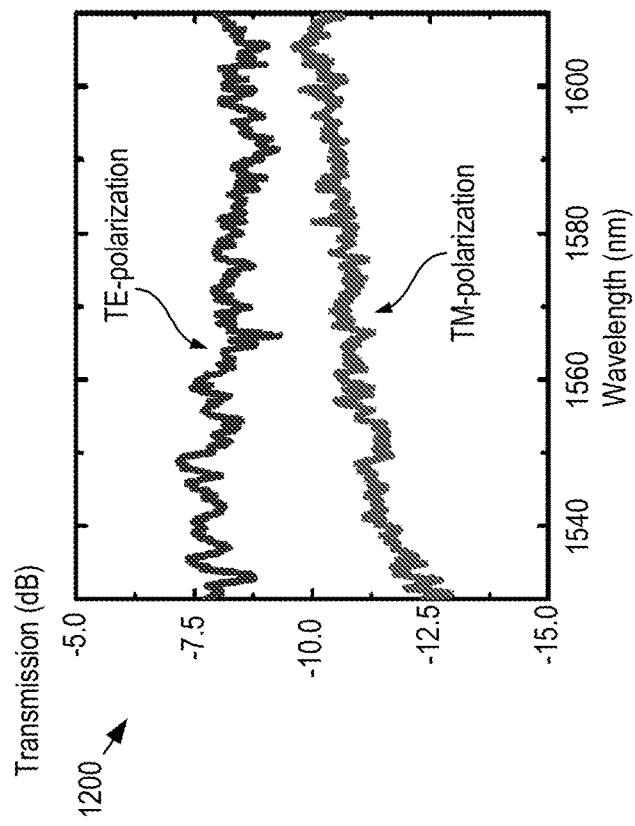
FIG. 12 shows the measured spectral response of a switching cell in accordance with the present invention.

FIG. 12 shows the measured spectral response of a switching cell in accordance with the present invention. Plot 1200 shows less than 3.4 dB variation for each of the TE- and TM-polarization modes across an 80-nm wide spectral range that extends from 1530 nm to 1610 nm.

Figure 13:
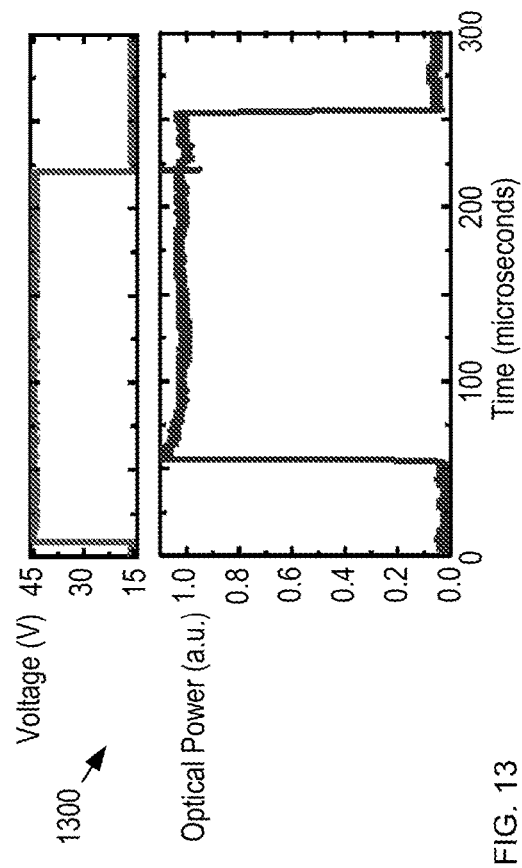
FIG. 13 shows the temporal response of a switching cell in accordance with the present invention.

FIG. 13 shows the temporal response of a switching cell in accordance with the present invention. Plot 1300 shows a turn-on time of approximately 46 microseconds and a turn-off time of approximately 33 microseconds. It should be noted that the measured response time was not limited by the mechanical resonant frequency of the actuators but, rather, by an RC time constant of electrodes 802 and 804 that was significantly higher than expected. The high RC time constant arose due to a higher-than-normal resistivity of the polysilicon used in the measured devices due to processing errors that led to an inadequate doping levels. With proper device fabrication, switching speeds as low a one or two microseconds are believed to be well within the capabilities of switching cells in accordance with the present invention.

It should be noted that other optical switching systems can be formed by combining multiple 1×2 and/or 2×2 switching cells in different configurations, such as data-network cross-point switches, ROADMs, wavelength-selective cross-connects, and the like, and such embodiments are within the scope of the present invention. In some embodiments, additional optical elements, such as wavelength dispersive devices (e.g., diffraction gratings, prisms, waveguide grating routers, etc.), PLC combiners, splitters, and the like, are included to increase the system functionality. Some examples of optical switching systems for which the present invention is applicable are disclosed in U.S. Patent Publication No. 20160327751, published Nov. 10, 2016, which is incorporated herein by reference.

Figure 14:
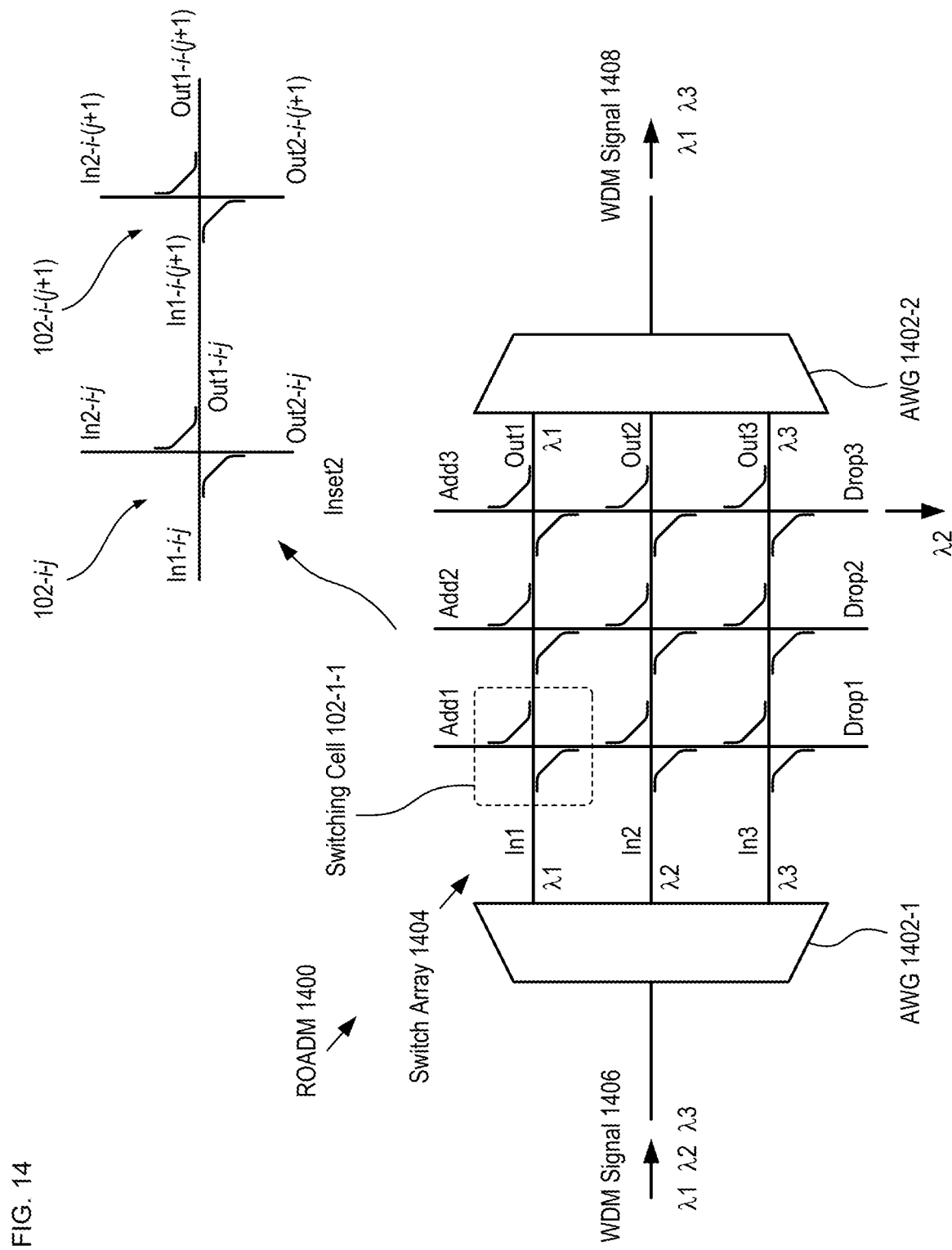
FIG. 14 depicts a schematic drawing of a reconfigurable optical add-drop multiplexer in accordance with the present invention.

FIG. 14 depicts a schematic drawing of a reconfigurable optical add-drop multiplexer in accordance with the present invention. System 1400 is provided herein as an example of another optical switching system in accordance with the present invention. System 1400 includes array waveguide gratings 1402-1 and 1402-2 and switch array 1404.

Switch array includes a 3×3 array of switching cells 202, which are arranged in a 3×3 array that is analogous to the cell array 102 described above.

Each of array waveguide gratings (AWG) 1402-1 and 1402-2 is a conventional PLC-based array waveguide grating operative for either distributing a plurality of wavelength signals of a wavelength-division-multiplexed (WDM signal) into a plurality of output waveguides or combining a plurality of waveguide signals received at a plurality of input waveguides into a WDM signal and providing it at an output waveguide.

In operation, WDM signal 1406 is received at conventional AWG 1402-1, which separates individual wavelength signals, λ1 through λ3, in the WDM signal and provides them to inputs In1 through In3 of switching cell 102, respectively.

Switching cells 102 are controlled to distribute the wavelength signals as desired. For example, FIG. 14 depicts switch array 1404 in state in which it is configured to pass λ1 through λ3 to outputs Out1 and Out3, respectively, while λ2 is dropped to drop port Drop3.

Outputs Out1 through Out3 are optically coupled with AWG 1402-2, which recombines these two wavelength signals into WDM signal 1408.

It should be noted that switching cell 102 also includes a plurality of input ports, Add1 through Add3, which can be used to replace any dropped wavelength signals with a new light signal at the same wavelength.

FIG. 14 includes Inset2, which depicts the input/output connectivity of two adjacent switching cells 102-i-j and 102-i-(j+1) in a row of switch array 1404, where i=1 through N and j=1 through M, N is the number of rows and M is the number of columns in the switch array. One skilled in the art will recognize that the input/output connectivity of two switching cells in a column (i.e., 102-i-j and 102-(i+1)-j)) is analogous to that shown in Inset2. Furthermore, the depicted interconnectivity between switching cells is representative of that of the switching-cell arrays included in any embodiment of the present invention.

Figure 15:
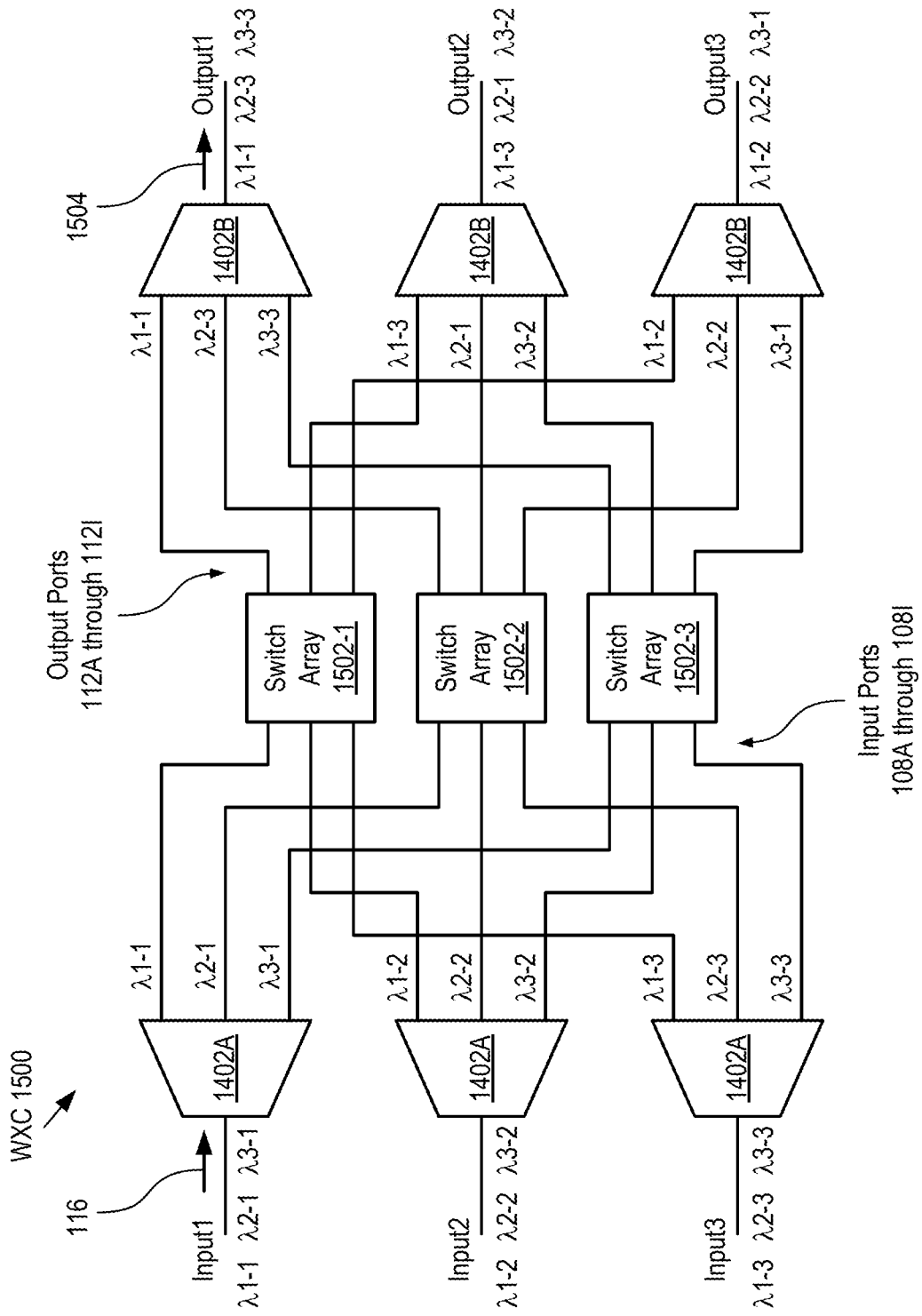
FIG. 15 depicts a schematic drawing of a wavelength-selective cross-connect in accordance with the present invention.

FIG. 15 depicts a schematic drawing of a wavelength-selective cross-connect in accordance with the present invention. Wavelength-selective cross-connect (WXC) 1500 is provided herein as an example of another optical switching system in accordance with the present invention. WXC 1500 includes switch arrays 1502-1 through 1502-3 and AWGs 1402A and 1402B.

Each of switch arrays 1502-1 through 1502-3 (referred to, collectively, as switch arrays 1502) is a 3×3 array of switching cells 102. The array of switching cells are arranged such that each switching array has three input ports 108 that can be reconfigured to any of three output ports 112.

Each AWG 1402A receives a WDM signal and distributes its wavelength signals such that each is provided on a different output waveguide. In the depicted example, each AWG 1402A is configured to receive a WDM signal comprising three wavelength signals, $\lambda 1$, $\lambda 2$, and $\lambda 3$ at its respective input and provide each wavelength signal on a different output waveguide.

Each AWG 1402B is operative for receiving a plurality of wavelength signals from switch arrays 1502 and combining them into a WDM signal provided on its respective output waveguide. In the depicted example, each AWG 1402B is configured to receive three wavelength signals, $\lambda 1$, $\lambda 2$, and $\lambda 3$ and provide a composite WDM signal on its respective output waveguide.

One skilled in the art will recognize, after reading this Specification, that an AWG is only one of several wavelength-dispersive components suitable for use in WXC 1500. Other suitable components include, without limitation, other wavelength dispersive devices (e.g., diffraction gratings, prisms, etc.), PLC combiners, splitters, and the like.

Switch arrays 1502 and AWGs 1402 are arranged such that each AWG sends the same wavelength component to the same switch array. As a result, each switch array handles light of only one wavelength. For example, as depicted, switch array 1502-1 receives only light signals characterized by $\lambda 1$ (i.e., $\lambda 1$-1, $\lambda 1$-2, and $\lambda 1$-3), switch array 1502-2 receives only light signals characterized by $\lambda 2$ (i.e., $\lambda 2$-1, $\lambda 2$-2, and $\lambda 2$-3), and switch array 1502-3 receives only light signals characterized by $\lambda 3$ (i.e., $\lambda 3$-1, $\lambda 3$-2, and $\lambda 3$-3).

Once received, each switch array can reroute any of the wavelength signals it receives to any of its output ports 112. For example, as depicted in FIG. 15, switch array 1502-1 routes $\lambda 1$-1 such that it continues its original path onto Output1; however, it reroutes $\lambda 1$-3 to Output2 and $\lambda 1$-2 to Output3. Switch array 1502-2 reroutes all of its received wavelength signals such that $\lambda 2$-1 is routed onto Output2, $\lambda 2$-2 is rerouted to Output3, and $\lambda 2$-3 is rerouted to Output1. Switch array 1502-3 routes $\lambda 3$-2 such that it continues its original path onto Output2; however, it reroutes $\lambda 3$-1 onto Output3 and reroutes $\lambda 3$-3 to Output1.

It is to be understood that the disclosure teaches just one example of the illustrative embodiment and that many variations of the invention can easily be devised by those skilled in the art after reading this disclosure and that the scope of the present invention is to be determined by the following claims.

What is claimed is:

1. An optical switching system (100) disposed on a substrate that defines a first plane (P1), the optical switching system comprising a first switching cell (102-1-1) that includes:
    a first bus waveguide (202-1) having a first input (IP1-1-1) and a first output (OP1-1-1), wherein the first bus waveguide is dimensioned and arranged to support propagation of a first light signal (116) comprising both transverse-electric (TE) and transverse-magnetic (TM) polarization modes, and wherein the first bus waveguide resides in a second plane (P2) that is parallel with the first plane;
    a second bus waveguide (202-2) having a second output (OP2-1-1), wherein the second bus waveguide is dimensioned and arranged to support propagation of the first light signal, and wherein the second bus waveguide resides in a third plane (P3) that is parallel with the first plane, the second and third planes being separated by a first separation (d1); and
    a first shunt waveguide (204-1) that is movable with respect to the substrate, wherein the first shunt waveguide is dimensioned and arranged to support propagation of the first light signal;
    wherein at least one of the first bus waveguide and the second bus waveguide is dimensioned and arranged such that the TE- and TM-polarization modes of the first light signal are characterized by group velocities that are equal within 10%;
    wherein, when the first shunt waveguide is in a first position; (1) the first shunt waveguide is optically decoupled from each of the first and second bus waveguides, and (2) the first input is optically coupled with the first output and substantially optically decoupled from the second output; and
    wherein, when the first shunt waveguide is in a second position; (1) the first shunt waveguide is optically coupled with the first and second bus waveguides, and (2) the first input is substantially optically decoupled from the first output and optically coupled with the second output through the first shunt waveguide.

2. The system of claim 1 wherein, when the first shunt waveguide is in the second position; (1) a first end of the first shunt waveguide and the first bus waveguide collectively define a first adiabatic coupler (212-1) and (2) a second end of the first shunt waveguide and the second bus waveguide collectively define a second adiabatic coupler (212-2).

3. The system of claim 2 wherein each of the first adiabatic coupler and second adiabatic coupler is characterized by an insertion loss of 1 dB or less for each of the TE-polarization-mode and the TM-polarization-mode of the first light signal.

4. The system of claim 1 further comprising a second shunt waveguide (204-2) that is movable with respect to the substrate, the second shunt waveguide being dimensioned and arranged to support propagation of the first light signal;
    wherein the second bus waveguide further includes a second input (IP2-1-1); and
    wherein, when the second shunt waveguide is in a third position; (1) the second shunt waveguide is optically decoupled from each of the first and second bus waveguides, and (2) the second input is optically coupled with the second output and substantially optically decoupled from the first output; and
    wherein, when the second shunt waveguide is in a fourth position; (1) the second shunt waveguide is optically coupled with the first and second bus waveguides, and (2) the second input is substantially optically decoupled from the second output and optically coupled with the first output through the second shunt waveguide.

5. The system of claim 1 further comprising a first actuator (206) that is operative for moving the first shunt waveguide between the first and second positions.

6. The system of claim 5 wherein the actuator is a two-stage actuator having a first stage (Stage1) that is operative for moving a first end (208-1) of the first shunt waveguide by a first distance and a second stage (Stage2)

that is operative for moving a second end (208-2) of the first shunt waveguide by second distance that is different than the first distance.

7. The system of claim 5 wherein the actuator is an electrostatic actuator.

8. The system of claim 5 wherein the actuator is selected from the group consisting of a thermal actuator, a magnetic actuator, and an electromagnetic actuator.

9. The system of claim 1 wherein each of the first bus waveguide and the second bus waveguide is dimensioned and arranged such that the TE- and TM-polarization modes of the first light signal are characterized by group velocities that are equal within 10%.

10. The system of claim 9 wherein each of the first bus waveguide and the second bus waveguide is dimensioned and arranged such that each of the TE- and TM-polarization modes is characterized by the same group velocity.

11. The system of claim 1 further comprising an edge coupler (106) that is operative for optically coupling each of the TE- and TM-polarization-modes of the first light signal between an external element (708) and one of the first and second bus waveguides.

12. The system of claim 11 wherein the edge coupler includes a spot-size converter (702).

13. The system of claim 1 further comprising a second switching cell (102-1-2), wherein the second switching cell comprises:
a third bus waveguide (202-1) having a second input (IP1-1-2), and a third output (OP1-1-2), wherein the third bus waveguide is dimensioned and arranged to support propagation of the first light signal, and wherein the third bus waveguide resides in the second plane;
a fourth bus waveguide (202-2) having a fourth output (OP2-1-2) wherein the fourth bus waveguide is dimensioned and arranged to support propagation of the first light signal, and wherein the second bus waveguide resides in the third plane; and
a second shunt waveguide (204-1) that is movable with respect to the substrate, wherein the second shunt waveguide is dimensioned and arranged to support propagation of the first light signal;
wherein, when the second shunt waveguide is in a first position; (1) the second shunt waveguide is optically decoupled from each of the third and fourth bus waveguides, and (2) the second input is optically coupled with the third output and substantially optically decoupled from the fourth output;
wherein, when the second shunt waveguide is in a second position; (1) the second shunt waveguide is optically coupled with the third and fourth bus waveguides, and (2) the second input is substantially optically decoupled from the third output and optically coupled with the fourth output through the second shunt waveguide.

14. The system of claim 13 wherein the first switching cell (102-1-1) and second switching cell (102-1-2) are arranged such that the first output (OP1-1-1) is optically coupled with the second input (IP1-1-2) such that:
when the first shunt waveguide is in the first position and the second shunt waveguide is in the first position, the first input (IP1-1-1) is optically coupled with the third output (OP1-1-2);
when the first shunt waveguide is in the first position and the second shunt waveguide is in the second position, the first input is optically coupled with the fourth output (OP2-1-2); and when the first shunt waveguide is in the second position, the first input is optically decoupled from each of the third output and fourth output.

15. The system of claim 1 further comprising a switch array (1404) that includes a plurality of switching cells comprising the first switching cell, wherein the switch array includes a plurality of input ports (108) and a plurality of output ports (112), and wherein the plurality of switching cells is arranged such that each input port of the plurality thereof can be optically coupled to any output port of the plurality thereof.

16. The system of claim 15 further comprising:
a first wavelength-dispersive element (1402A) operative for separating the first light signal into a plurality of wavelength signals ($\lambda 1$, $\lambda 2$, $\lambda 3$) and providing each wavelength signal of the plurality thereof to a different input port of the plurality thereof; and
a second wavelength dispersive element (1402B) operative for receiving the plurality of wavelength signals from the plurality of output ports and combining the plurality of wavelength signals into a second light signal (1504).

17. A method for forming an optical switching system (100) that is operative for switching a first light signal (116) comprising both transverse-electric (TE) and transverse-magnetic (TM) polarization modes, the method comprising:
(a) forming a first switching cell (102-1-1), wherein the first switching cell is formed by operations comprising:
(i) forming a first bus waveguide (202-1) on a substrate that defines a first plane (P1), the first bus waveguide having a first input (IP1-1-1) and a first output (OP1-1-1), wherein the first bus waveguide is dimensioned and arranged to support propagation of the first light signal, and wherein the first bus waveguide resides in a second plane (P2) that is parallel with the first plane;
(ii) forming a second bus waveguide (202-2) having a second output (OP2-1-1), wherein the second bus waveguide is dimensioned and arranged to support propagation of the first light signal, and wherein the second bus waveguide resides in a third plane (P3) that is parallel with the first plane, the second and third planes being separated by a first separation (d1);
(iii) forming a first shunt waveguide (204-1) that is movable with respect to the substrate, wherein the first shunt waveguide is dimensioned and arranged to support propagation of the first light signal; and
(iv) forming a first actuator (206) that is operative for moving the first shunt waveguide between (1) a first position in which it is optically decoupled with the first and second bus waveguides and (2) a second position in which it is optically coupled with each of the first and second bus waveguides;
wherein at least one of the first bus waveguide and the second bus waveguide is formed such that the TE- and TM-polarization modes of the first light signal are characterized by group velocities that are equal within 10%.

18. The method of claim 17 wherein the first switching cell is formed by operations further comprising:
(v) forming a second shunt waveguide (204-2) that is movable with respect to the substrate, wherein the second shunt waveguide is dimensioned and arranged to support propagation of the first light signal;
wherein the actuator is formed such that it is operative for moving the second shunt waveguide between (3) a third position in which it is optically decoupled with the first and second bus waveguides and (4) a fourth position in which it is optically coupled with each of the first and second bus waveguides.

19. The method of claim 18 wherein the actuator is formed such that it is operatively coupled with each of the first shunt waveguide and the second shunt waveguide.

20. The method of claim 17 further comprising:
(b) forming a second switching cell (102-1-2), wherein the second switching cell is formed by operations comprising:
  (i) forming a third bus waveguide (202-1) having a second input (IP1-1-2) and a third output (OP1-1-2), wherein the third bus waveguide is dimensioned and arranged to support propagation of the first light signal, and wherein the third bus waveguide resides in the second plane;
  (ii) forming a fourth bus waveguide (202-2) having a fourth output (OP2-1-2), wherein the fourth bus waveguide is dimensioned and arranged to support propagation of the first light signal, and wherein the fourth bus waveguide resides in the third plane; and
  (iii) forming a second shunt waveguide (204-1) that is movable with respect to the substrate, wherein the second shunt waveguide is dimensioned and arranged to support propagation of the first light signal; and
  (iv) forming a second actuator (206) that is operative for moving the second shunt waveguide between (1) a first position in which it is optically decoupled with the third and fourth bus waveguides and (2) a second position in which it is optically coupled with each of the third and fourth bus waveguides;
wherein the first output is optically coupled with the second input.

21. The method of claim 17 further comprising (b) forming an edge coupler (106) that is operative for optically coupling each of the TE- and TM-polarization-modes of the first light signal between a first element (708) and one of the first and second bus waveguides, wherein the first element is selected from the group consisting of an optical fiber, a light source, and a detector.

22. The method of claim 21 wherein the edge coupler includes a spot-size converter (702).

23. The method of claim 17 wherein, when the first shunt waveguide is in the second position: (1) the first bus waveguide and the first shunt waveguide collectively define a first adiabatic coupler (212-1) and (2) the second bus waveguide and the first shunt waveguide collectively define a second adiabatic coupler (212-2).

24. The method of claim 17 wherein the actuator is formed as a two-stage actuator having a first stage (Stage1) that is operative for moving a first end (208-1) of the first shunt waveguide by a first distance and a second stage (Stage2) that is operative for moving a second end (208-2) of the first shunt waveguide by second distance that is different than the first distance.

25. The system of claim 17 wherein the actuator is an electrostatic actuator.

26. The system of claim 17 wherein the actuator is selected from the group consisting of a thermal actuator, a magnetic actuator, and an electromagnetic actuator.

27. The system of claim 17 wherein at least one of the first bus waveguide and the second bus waveguide is formed such that the TE- and TM-polarization modes of the first light signal are characterized by substantially the same group velocity.

* * * * *